United States Patent
Chen et al.

(10) Patent No.: US 10,353,179 B2
(45) Date of Patent: *Jul. 16, 2019

(54) OPTICAL IMAGE LENS SYSTEM

(71) Applicant: LARGAN PRECISION CO., LTD., Taichung (TW)

(72) Inventors: Chun-Shan Chen, Taichung (TW); Tsung-Han Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,616

(22) Filed: Dec. 20, 2017

(65) Prior Publication Data
US 2018/0113283 A1   Apr. 26, 2018

Related U.S. Application Data

(63) Continuation of application No. 15/377,944, filed on Dec. 13, 2016, now Pat. No. 9,897,783, which is a (Continued)

(30) Foreign Application Priority Data

Apr. 20, 2012  (TW) .............................. 101114204 A

(51) Int. Cl.
*G02B 3/02* (2006.01)
*G02B 13/18* (2006.01)
(Continued)

(52) U.S. Cl.
CPC ......... *G02B 13/0045* (2013.01); *G02B 5/005* (2013.01); *G02B 5/208* (2013.01); *G02B 9/62* (2013.01); *G02B 27/0025* (2013.01)

(58) Field of Classification Search
CPC ...... G02B 13/0045; G02B 9/62; G02B 13/18; G02B 27/0025; G02B 3/04; G02B 5/208;
(Continued)

(56) References Cited

U.S. PATENT DOCUMENTS 5,216,545 A   6/1993  Saito
5,463,499 A   10/1995  Ito et al.
(Continued)

FOREIGN PATENT DOCUMENTS

CN   101365975 A   2/2009
CN   101553748 A   10/2009
(Continued)

*Primary Examiner* — Brandi N Thomas
(74) *Attorney, Agent, or Firm* — CKC & Partners Co., LLC

(57) ABSTRACT

An optical image lens system includes, in order from an object side to an image side, a first lens element, a second lens element, a third lens element, a fourth lens element, a fifth lens element and a sixth lens element. The first lens element has positive refractive power. The second lens element has positive refractive power. The third lens element has positive refractive power. The fourth lens element has refractive power. The fifth lens element with refractive power has an image-side surface being convex in a paraxial region thereof, wherein at least one surface of the fifth lens element is aspheric. The sixth lens element with refractive power has an image-side surface being concave in a paraxial region thereof, wherein at least one surface of the sixth lens element is aspheric, and the image-side surface of the sixth lens element has at least one inflection point thereon.

22 Claims, 18 Drawing Sheets

Related U.S. Application Data continuation of application No. 14/838,379, filed on Aug. 28, 2015, now Pat. No. 9,726,860, which is a continuation of application No. 13/652,485, filed on Oct. 16, 2012, now Pat. No. 9,488,802.

(51) Int. Cl.
*G02B 17/00* (2006.01)
*G02B 13/00* (2006.01)
*G02B 9/62* (2006.01)
*G02B 5/00* (2006.01)
*G02B 5/20* (2006.01)
*G02B 27/00* (2006.01)

(58) Field of Classification Search
CPC ...... G02B 13/02; G02B 13/002; G02B 5/005; G02B 13/0015
USPC ....... 359/641, 658, 713, 727, 728, 729, 731, 359/756
See application file for complete search history.

(56) References Cited

U.S. PATENT DOCUMENTS

| | | | |
|---|---|---|---|
| 5,475,536 A | 12/1995 | Kikutani | |
| 6,028,717 A | 2/2000 | Kohno et al. | |
| 7,869,142 B2 | 1/2011 | Chen et al. | |
| 8,000,030 B2 | 8/2011 | Tang | |
| 8,000,031 B1 | 8/2011 | Tsai | |
| 8,472,128 B2 | 6/2013 | Huang | |
| 9,726,860 B2 * | 8/2017 | Chen | G02B 13/0045 |
| 2005/0259228 A1 | 11/2005 | Inadachi et al. | |
| 2007/0146903 A1 * | 6/2007 | Tamura | G02B 9/16 359/785 |
| 2008/0304162 A1 | 12/2008 | Yamasaki | |
| 2012/0194726 A1 | 8/2012 | Huang et al. | |
| 2012/0212836 A1 * | 8/2012 | Hsieh | G02B 13/0045 359/708 |
| 2013/0033762 A1 | 2/2013 | Tsai et al. | |
| 2013/0215520 A1 * | 8/2013 | Lai | G02B 13/0045 359/713 |
| 2014/0347745 A1 | 11/2014 | Shinohara | |

FOREIGN PATENT DOCUMENTS

| | | |
|---|---|---|
| JP | 1995-027976 A | 1/1995 |
| JP | 1997-090222 A | 4/1997 |
| JP | 11-218687 A | 8/1999 |
| TW | I339276 B1 | 3/2011 |
| TW | 201200931 A1 | 1/2012 |
| WO | 2011118554 A1 | 9/2011 |

* cited by examiner

OPTICAL IMAGE LENS SYSTEM

RELATED APPLICATIONS

The present application is a continuation of the application Ser. No. 15/377,944, filed on Dec. 13, 2016, which is a continuation of the application Ser. No. 14/838,379, filed on Aug. 28, 2015, U.S. Pat. No. 9,726,860, which is a continuation of the application Ser. No. 13/652,485, filed Oct. 16, 2012, U.S. Pat. No. 9,488,802, the entire contents of which are hereby incorporated herein by reference, which claims priority to Taiwan Application Serial Number 101114204, filed Apr. 20, 2012, all of which are herein incorporated by reference.

BACKGROUND

Technical Field

The present invention relates to an optical image lens system. More particularly, the present invention relates to a compact optical image lens system applicable to electronic products and three-dimensional (3D) image applications thereof.

Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens such as the one disclosed in U.S. Pat. No. 7,869,142. Due to the popularity of mobile products with high-end specifications, such as smart phones and PDAs (Personal Digital Assistants), the requirements for high resolution and image quality of modern compact optical lens systems has been increasing significantly. However, the conventional four-element lens structure cannot satisfy these requirements of the compact optical lens system.

Although other conventional optical lens system with five-element lens structure such as the ones disclosed in U.S. Pat. Nos. 8,000,030 and 8,000,031 enhance image quality and resolving power, these optical designs still reside with unsolved problems. Since there are no three continuous lens elements closest to the object side with positive refractive power, it is not favorable for presenting its telephoto functionality in which the telephoto ratio is thereby limited. These optical designs are also hard to keep the lens system compact while achieving for the same telephoto ratio. Besides, these optical designs are not favorable for reducing the sensitivity of the lens system because its positive refractive power of these optical systems is not effectively distributed.

SUMMARY

According to one aspect of the present disclosure, an optical image lens system includes, in order from an object side to an image side, a first lens element, a second lens element, a third lens element, a fourth lens element, a fifth lens element and a sixth lens element. The first lens element has positive refractive power. The second lens element has positive refractive power. The third lens element has positive refractive power. The fourth lens element has refractive power. The fifth lens element with refractive power has an image-side surface being convex in a paraxial region thereof, wherein at least one of an object-side surface and the image-side surface of the fifth lens element is aspheric. The sixth lens element with refractive power has an image-side surface being concave in a paraxial region thereof, wherein at least one of an object-side surface and the image-side surface of the sixth lens element is aspheric, and the image-side surface of the sixth lens element has at least one inflection point thereon. The optical image lens system has a total of six lens elements with refractive power, and of the first lens element, the second lens element, the third lens element, the fourth lens element, the fifth lens element and the sixth lens element of the optical image lens system, there is a space in a paraxial region between every pair of lens elements that are adjacent to each other.

According to another aspect of the present disclosure, an optical image lens system includes, in order from an object side to an image side, a first lens element, a second lens element, a third lens element, a fourth lens element, a fifth lens element and a sixth lens element. The first lens element has positive refractive power. The second lens element has positive refractive power. The third lens element has positive refractive power. The fourth lens element has refractive power. The fifth lens element with refractive power has at least one of an object-side surface and an image-side surface being aspheric. The sixth lens element with refractive power has an image-side surface being concave in a paraxial region thereof, wherein at least one of an object-side surface and the image-side surface of the sixth lens element is aspheric, and the image-side surface of the sixth lens element has at least one inflection point thereon. The optical image lens system has a total of six lens elements with refractive power. The optical image lens system further includes a stop located between an object and the first lens element, and of the first lens element, the second lens element, the third lens element, the fourth lens element, the fifth lens element and the sixth lens element of the optical image lens system, there is a space in a paraxial region between every pair of lens elements that are adjacent to each other.

According to further another aspect of the present disclosure, an optical image lens system includes, in order from an object side to an image side, a first lens element, a second lens element, a third lens element, a fourth lens element, a fifth lens element and a sixth lens element. The first lens element has positive refractive power. The second lens element has positive refractive power. The third lens element has positive refractive power. The fourth lens element has refractive power. The fifth lens element with refractive power has at least one of an object-side surface and an image-side surface being aspheric. The sixth lens element with refractive power has an object-side surface being convex in a paraxial region thereof and an image-side surface being concave in a paraxial region thereof, wherein at least one of the object-side surface and the image-side surface of the sixth lens element is aspheric, and the image-side surface of the sixth lens element has at least one inflection point thereon. The optical image lens system has a total of six lens elements with refractive power, and of the first lens element, the second lens element, the third lens element, the fourth lens element, the fifth lens element and the sixth lens element of the optical image lens system, there is a space in a paraxial region between every pair of lens elements that are adjacent to each other.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
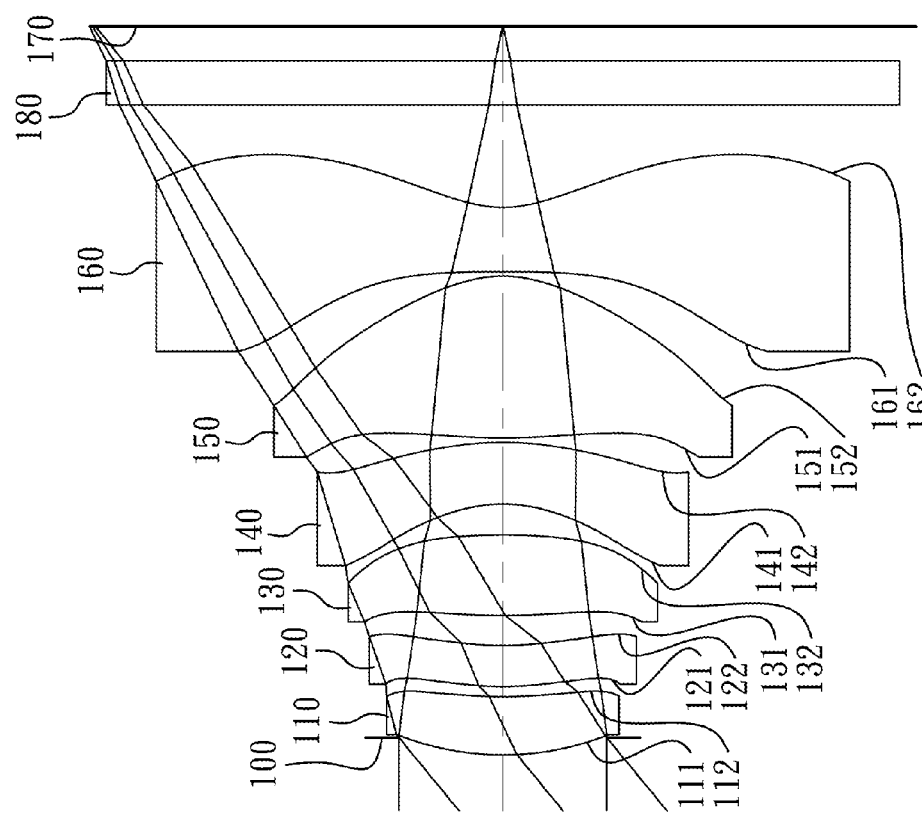
FIG. 1 is a schematic view of an optical image lens system according to the 1st embodiment of the present disclosure.

An optical image lens system includes, in order from an object side to an image side, a first lens element, a second lens element, a third lens element, a fourth lens element, a fifth lens element and a sixth lens element.

The first lens element with positive refractive power has a convex object-side surface, and can have a concave image-side surface, so that the total track length of the optical image lens system can be reduced by properly adjusting the positive refractive power of the first lens element.

The second lens element with positive refractive power can have a convex object-side surface and a concave image-side surface. Therefore, the sensitivity of the optical image lens system can be reduced by balancing the distribution of the positive refractive power of the first lens element, and the surface curvature of the second lens element can thereby correct the astigmatism of the optical image lens system.

The third lens element with positive refractive power can enhance the telephoto functionality of the optical image lens system by combining with the positive refractive power of the first lens element and the second lens element. Therefore, the optical image lens system can obtain a good telephoto ratio when applying to the six-lens optical system with high resolving power. The six-lens optical image lens system can thereby not only keep its optical system compact but also obtain a better image quality. Furthermore, the third lens element can have a convex image-side surface for adjusting the positive refractive power of the third lens element.

The fourth lens element with negative refractive power has a concave object-side surface and a convex image-side surface, so that the aberration generated from the first through third lens elements with positive refractive power can be corrected, and the astigmatism of the optical image lens system can also be corrected.

The fifth lens element with positive refractive power has a convex image-side surface. Therefore, the high order aberration of the optical image lens system can be corrected by adjusting the refractive power of the fifth lens element for enhancing the resolving power and retaining high image quality.

The sixth lens element with negative refractive power has a concave image-side surface, so that the principal point of the optical image lens system can be positioned away from the image plane, and the total track length of the optical image lens system can be reduced so as to maintain the compact size of the optical image lens system. Furthermore, the sixth lens element has at least one inflection point on the image-side surface thereof, so that the angle at which the incident light projects onto an image sensor from the off-axis field can be effectively reduced, and the aberration of the off-axis field can be further corrected.

When a focal length of the optical image lens system is f, and a focal length of the second lens element is f2, the following relationship is satisfied:

$0 < f/f2 < 0.8.$

Therefore, the distribution of the positive refractive power can be properly balanced for reducing the sensitivity of the optical image lens system, and the manufacturing, the assembling or the environmental test of the optical image lens system can be more stable.

f and f2 can further satisfy the following relationship:

$0 < f/f2 < 0.55.$

When the focal length of the optical image lens system is f, a focal length of the third lens element is f3, and a focal length of the fourth lens element is f4, the following relationship is satisfied:

$1.4 < f/f3 + |f/f4| < 2.6.$

Therefore, the distribution of the refractive power of the optical image lens system can be balanced by properly adjusting the refractive power of the third lens element and the sensitivity of the optical image lens system can be reduced. Moreover, the aberration generated from the third lens element can be corrected by adjusting the refractive power of the fourth lens element.

When a curvature radius of the object-side surface of the fourth lens element is R7, and a curvature radius of the image-side surface of the fourth lens element is R8, the following relationship is satisfied:

$$-0.90<(R7-R8)/(R7+R8)<0.$$

By adjusting the surface curvature of the fourth lens element, the aberration generated from the first through third lens elements and the astigmatism can be corrected.

R7 and R8 can further satisfy the following relationship:

$$-0.50<(R7-R8)/(R7+R8)<0.$$

When a central thickness of the second lens element is CT2, and a central thickness of the third lens element is CT3, the following relationship is satisfied:

$$0<CT2/CT3<0.75.$$

Therefore, the thickness of the second lens element and the third lens element is favorable for manufacturing and assembling the optical image lens system and thereby the manufacturing yield rate can be increased.

When an Abbe number of the fourth lens element is V4, and an Abbe number of the fifth lens element is V5, the following relationship is satisfied:

$$1.5<V5/V4<3.5.$$

Therefore, the chromatic aberration of the optical image lens system can be corrected.

When a focal length of the first lens element is f1, and a focal length of the third lens element is f3, the following relationship is satisfied:

$$0<(f1-f3)/(f1+f3)<1.0.$$

Therefore, the third lens element provides the main positive refractive power to enhance the telephoto functionality of the optical image lens system and thereby the total track length of the optical image lens system is reduced for keeping the optical system compact.

When an Abbe number of the first lens element is V1, and an Abbe number of the second lens element is V2, the following relationship is satisfied:

$$0.7<V1/V2<1.3.$$

Therefore, the chromatic aberration of the optical image lens system can be corrected.

When a focal length of the second lens element is f2, and a focal length of the third lens element is f3, the following relationship is satisfied:

$$0.12<(f2-f3)/(f2+f3)<1.0.$$

Therefore, the distribution of the positive refractive power of the second lens element and the third lens element is proper for reducing the sensitivity of the optical image lens system, and the total track length of the optical image lens system can be effectively reduced by obtaining a good telephoto ratio.

According to the optical image lens system of the present disclosure, the lens elements thereof can be made of glass or plastic material. When the lens elements are made of glass material, the distribution of the refractive power of the optical image lens system may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the optical image lens system can also be reduced.

According to the optical image lens system of the present disclosure, when the lens element has a convex surface, it indicates that the paraxial region of the surface is convex; and when the lens element has a concave surface, it indicates that the paraxial region of the surface is concave.

According to the optical image lens system of the present disclosure, the optical image lens system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the second lens element is favorable for enlarging the field of view of the system and thereby provides a wider field of view for the same.

According to the above description of the present disclosure, the following 1st-9th specific embodiments are provided for further explanation.

1st Embodiment

Figure 2:
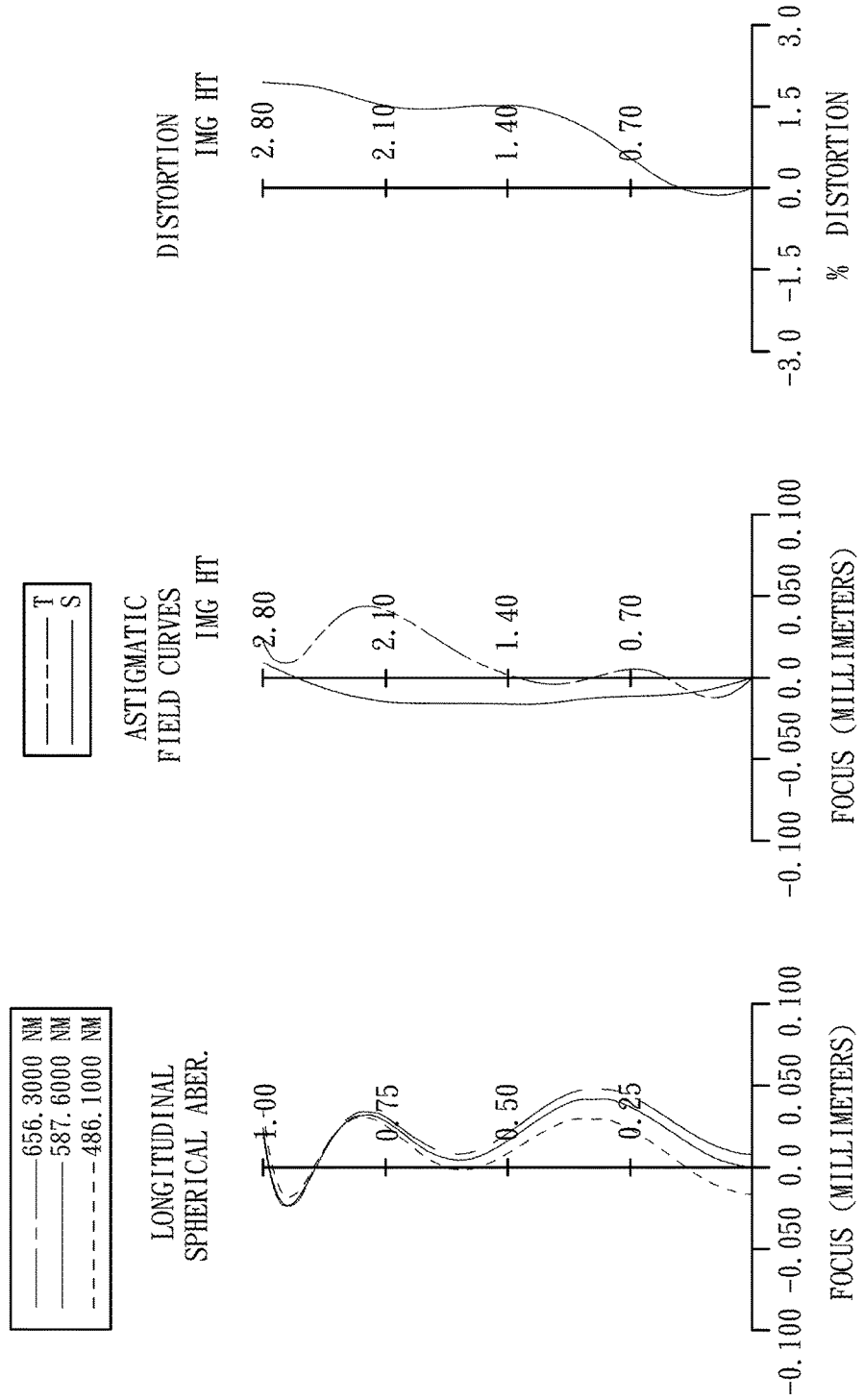
FIG. 2 shows spherical aberration curves, astigmatic field curves and a distortion curve of the optical image lens system according to the 1st embodiment.

FIG. 1 is a schematic view of an optical image lens system according to the 1st embodiment of the present disclosure. FIG. 2 shows spherical aberration curves, astigmatic field curves and a distortion curve of the optical image lens system according to the 1st embodiment. In FIG. 1, the optical image lens system includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with positive refractive power has a convex object-side surface 121 and a concave image-side surface 122. The second lens element 120 is made of plastic material and has the object-side surface 121 and the image-side surface 122 being aspheric.

The third lens element 130 with positive refractive power has a convex object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with positive refractive power has a convex object-side surface 151 and a convex image-side surface 152. The fifth lens element 150 is made of plastic material and has the object-side surface 151 and the image-side surface 152 being aspheric.

The sixth lens element 160 with negative refractive power has a concave object-side surface 161 and a concave image-side surface 162. The sixth lens element 160 is made of plastic material and has the object-side surface 161 and the image-side surface 162 being aspheric. Furthermore, the sixth lens element 160 has inflection points on the image-side surface 162 thereof.

The IR-cut filter 180 is made of glass, and located between the sixth lens element 160 and the image plane 170, and will not affect the focal length of the optical image lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical image lens system according to the 1st embodiment, when a focal length of the optical image lens system is f, an f-number of the optical image lens system is Fno, and half of the maximal field of view of the optical image lens system is HFOV, these parameters have the following values:

f=3.33 mm;
Fno=2.35; and
HFOV=39.4 degrees.

In the optical image lens system according to the 1st embodiment, when an Abbe number of the first lens element 110 is V1, an Abbe number of the second lens element 120 is V2, an Abbe number of the fourth lens element 140 is V4, and an Abbe number of the fifth lens element 150 is V5, the following relationships are satisfied:

$V1/V2=2.40;$ and $V5/V4=2.42.$

In the optical image lens system according to the 1st embodiment, when a central thickness of the second lens element 120 is CT2, and a central thickness of the third lens element 130 is CT3, the following relationship is satisfied:

$CT2/CT3=0.51.$

In the optical image lens system according to the 1st embodiment, when a curvature radius of the object-side surface 141 of the fourth lens element 140 is R7, and a curvature radius of the image-side surface 142 of the fourth lens element 140 is R8, the following relationship is satisfied:

$(R7-R8)/(R7+R8)=-0.37.$

In the optical image lens system according to the 1st embodiment, when the focal length of the optical image lens system is f, a focal length of the first lens element 110 is f1, a focal length of the second lens element 120 is f2, a focal length of the third lens element 130 is f3, and a focal length of the fourth lens element 140 is f4, the following relationships are satisfied:

$f/f2=0.13;$ $f/f3+|f/f4|=1.88;$ $(f1-f3)/(f1+f3)=0.41;$ and $(f2-f3)/(f2+f3)=0.73.$ The detailed optical data of the 1st embodiment are shown in Table 1 and the aspheric surface data are shown in Table 2 below.

TABLE 1

1st Embodiment
f = 3.33 mm, Fno = 2.35, HFOV = 39.4 deg.

| Surface # |  | Curvature Radius |  | Thickness | Material | Index | Abbe # | Focal length |
|---|---|---|---|---|---|---|---|---|
| 0 | Object | Plano |  | Infinity |  |  |  |  |
| 1 | Ape. Stop | Plano |  | -0.118 |  |  |  |  |
| 2 | Lens 1 | 1.952 | (ASP) | 0.398 | Plastic | 1.544 | 55.9 | 9.16 |
| 3 |  | 2.978 | (ASP) | 0.069 |  |  |  |  |
| 4 | Lens 2 | 2.003 | (ASP) | 0.280 | Plastic | 1.640 | 23.3 | 24.92 |
| 5 |  | 2.167 | (ASP) | 0.205 |  |  |  |  |
| 6 | Lens 3 | 4.143 | (ASP) | 0.551 | Plastic | 1.544 | 55.9 | 3.81 |
| 7 |  | -3.947 | (ASP) | 0.211 |  |  |  |  |
| 8 | Lens 4 | -0.969 | (ASP) | 0.421 | Plastic | 1.640 | 23.3 | -3.31 |
| 9 |  | -2.089 | (ASP) | 0.030 |  |  |  |  |
| 10 | Lens 5 | 3.867 | (ASP) | 1.105 | Plastic | 1.535 | 56.3 | 1.42 |
| 11 |  | -0.847 | (ASP) | 0.030 |  |  |  |  |
| 12 | Lens 6 | -16.711 | (ASP) | 0.440 | Plastic | 1.535 | 56.3 | -1.39 |
| 13 |  | 0.785 | (ASP) | 0.700 |  |  |  |  |
| 14 | IR-cut filter | Plano |  | 0.300 | Glass | 1.517 | 64.2 | — |
| 15 |  | Plano |  | 0.235 |  |  |  |  |
| 16 | Image | Plano |  | — |  |  |  |  |

Note:
Reference wavelength (d-line) is 587.6 nm.

TABLE 2

Aspheric Coefficients

| Surface # | 2 | 3 | 4 | 5 | 6 | 7 |
|---|---|---|---|---|---|---|
| k = | −2.1201E+00 | −2.0000E+01 | −1.2382E+01 | −3.0060E+00 | 1.0000E+00 | 0.0000E+00 |
| A4 = | 3.5988E−03 | −1.7492E−01 | −2.6551E−01 | −2.5306E−01 | −1.4680E−01 | −4.4328E−02 |
| A6 = | 3.7387E−01 | 9.8443E−02 | 5.7642E−01 | 3.1573E−01 | −1.9199E−02 | −1.6599E−01 |
| A8 = | −1.3929E+00 | 6.6244E−01 | −1.1253E+00 | −2.1258E−01 | 1.1489E−01 | 4.8223E−02 |
| A10 = | 1.4094E+00 | −1.7257E+00 | 1.1555E+00 | 9.4103E−02 | −1.6910E−01 | 9.4653E−03 |
| A12 = | 2.0282E+00 | 6.6955E−01 | 1.4439E−02 | −2.7001E−01 | −1.1287E−01 | 1.2137E−02 |
| A14 = | −3.6199E+00 | −3.4243E−01 | −1.9141E+00 | 1.1110E−01 | 1.2615E−01 | −8.1558E−03 |

| Surface # | 8 | 9 | 10 | 11 | 12 | 13 |
|---|---|---|---|---|---|---|
| k = | −1.4213E+00 | −3.0569E+00 | −6.3368E+00 | −4.2091E+00 | −2.0000E+01 | −5.1631E+00 |
| A4 = | 3.3847E−01 | 1.4102E−01 | −1.6984E−01 | −6.7672E−02 | −1.3442E−01 | −7.5325E−02 |
| A6 = | −8.7891E−01 | −2.7755E−01 | 1.4944E−01 | −3.0645E−02 | 3.8933E−02 | 2.4095E−02 |
| A8 = | 1.1445E+00 | 3.2138E−01 | −9.9124E−02 | 1.0444E−01 | −6.2383E−03 | −5.8920E−03 |
| A10 = | −9.1578E−01 | −2.4968E−01 | 1.3353E−02 | −8.3869E−02 | 7.5356E−04 | 1.0269E−03 |
| A12 = | 5.9482E−01 | 1.2901E−01 | 1.6198E−03 | 2.6536E−02 | 2.2005E−04 | −1.1564E−04 |
| A14 = | −2.0143E−01 | −2.7976E−02 | 1.2524E−03 | −2.7869E−03 | −5.2957E−05 | 5.9417E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
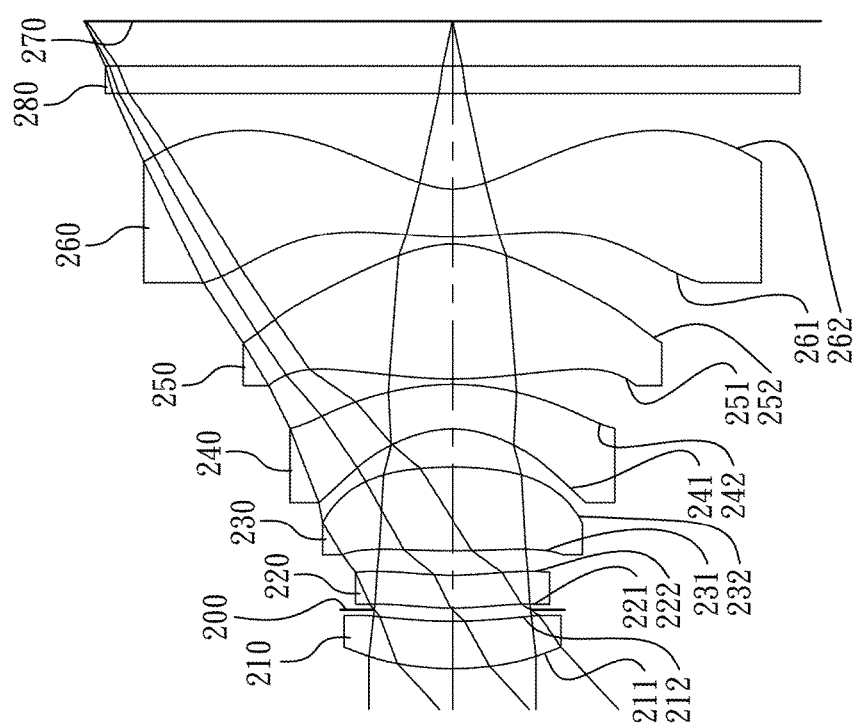
FIG. 3 is a schematic view of an optical image lens system according to the 2nd embodiment of the present disclosure.
Figure 4:
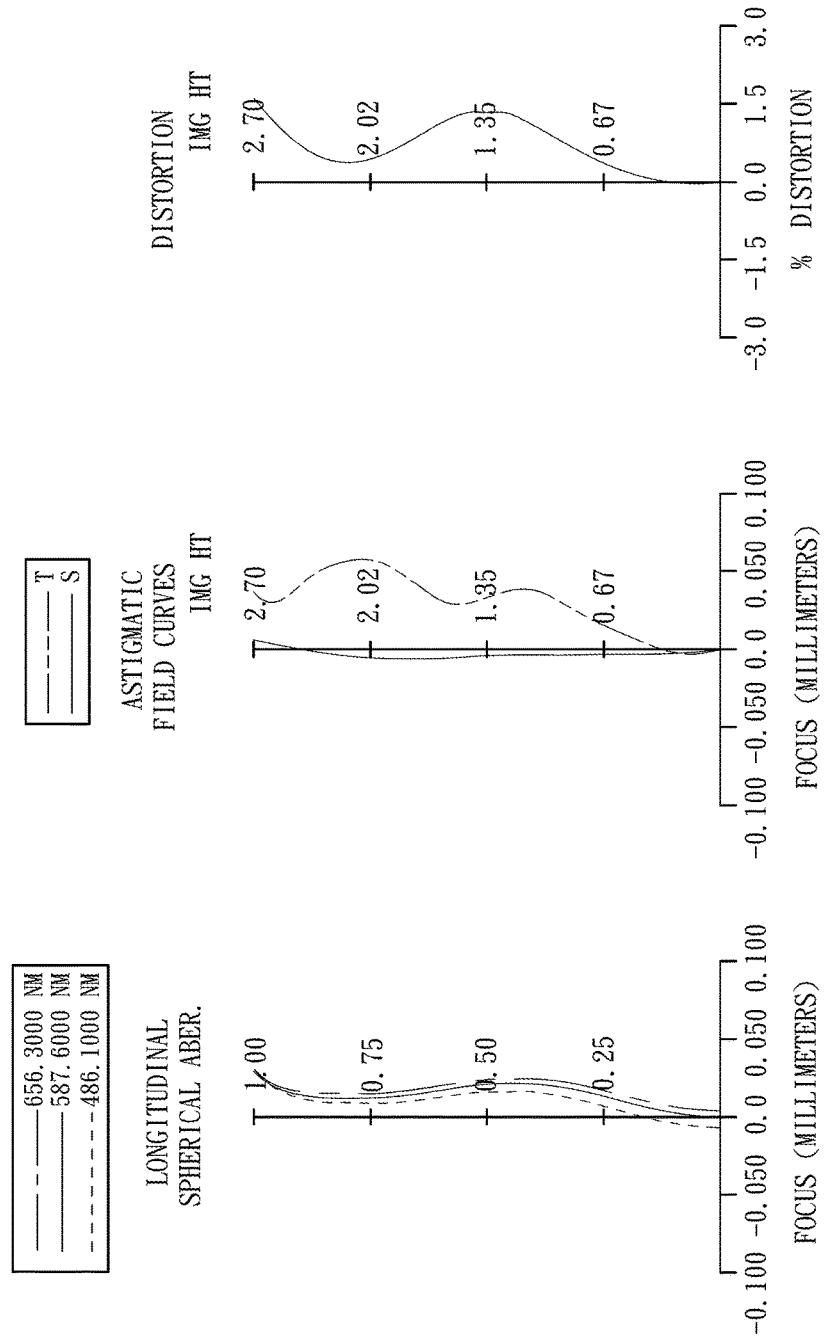
FIG. 4 shows spherical aberration curves, astigmatic field curves and a distortion curve of the optical image lens system according to the 2nd embodiment.

FIG. 3 is a schematic view of an optical image lens system according to the 2nd embodiment of the present disclosure. FIG. 4 shows spherical aberration curves, astigmatic field curves and a distortion curve of the optical image lens system according to the 2nd embodiment. In FIG. 3, the optical image lens system includes, in order from an object side to an image side, a first lens element 210, an aperture stop 200, a second lens element 220, a third lens element 230, a fourth lens element 240, a fifth lens element 250, a sixth lens element 260, an IR-cut filter 280 and an image plane 270.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with positive refractive power has a convex object-side surface 221 and a concave image-side surface 222. The second lens element 220 is made of plastic material and has the object-side surface 221 and the image-side surface 222 being aspheric.

The third lens element 230 with positive refractive power has a convex object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with positive refractive power has a convex object-side surface 251 and a convex image-side surface 252. The fifth lens element 250 is made of plastic material and has the object-side surface 251 and the image-side surface 252 being aspheric.

The sixth lens element 260 with negative refractive power has a convex object-side surface 261 and a concave image-side surface 262. The sixth lens element 260 is made of plastic material and has the object-side surface 261 and the image-side surface 262 being aspheric. Furthermore, the sixth lens element 260 has inflection points on the image-side surface 262 thereof.

The IR-cut filter 280 is made of glass, and located between the sixth lens element 260 and the image plane 270, and will not affect the focal length of the optical image lens system.

The detailed optical data of the 2nd embodiment are shown in Table 3 and the aspheric surface data are shown in Table 4 below.

TABLE 3

2nd Embodiment
f = 2.88 mm, Fno = 2.35, HFOV = 42.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.333 | (ASP) | 0.347 | Plastic | 1.544 | 55.9 | 9.77 |
| 2 | | 3.939 | (ASP) | 0.083 | | | | |
| 3 | Ape. Stop | Plano | | 0.014 | | | | |
| 4 | Lens 2 | 2.689 | (ASP) | 0.240 | Plastic | 1.640 | 23.3 | 97.03 |
| 5 | | 2.713 | (ASP) | 0.178 | | | | |
| 6 | Lens 3 | 5.719 | (ASP) | 0.618 | Plastic | 1.544 | 55.9 | 3.43 |
| 7 | | −2.667 | (ASP) | 0.278 | | | | |

TABLE 3-continued

2nd Embodiment
f = 2.88 mm, Fno = 2.35, HFOV = 42.6 deg.

| Surface # | | Curvature Radius | | Thickness | Material | Index | Abbe # | Focal length |
|---|---|---|---|---|---|---|---|---|
| 8 | Lens 4 | −0.802 | (ASP) | 0.327 | Plastic | 1.640 | 23.3 | −2.62 |
| 9 | | −1.780 | (ASP) | 0.040 | | | | |
| 10 | Lens 5 | 3.039 | (ASP) | 0.987 | Plastic | 1.544 | 55.9 | 1.24 |
| 11 | | −0.766 | (ASP) | 0.054 | | | | |
| 12 | Lens 6 | 3.038 | (ASP) | 0.353 | Plastic | 1.544 | 55.9 | −1.36 |
| 13 | | 0.572 | (ASP) | 0.700 | | | | |
| 14 | IR-cut filter | Plano | | 0.200 | Glass | 1.517 | 64.2 | — |
| 15 | | Plano | | 0.328 | | | | |
| 16 | Image | Plano | | — | | | | |

Note:
Reference wavelength (d-line) is 587.6 nm.

TABLE 4

Aspheric Coefficients

| Surface # | 1 | 2 | 4 | 5 | 6 | 7 |
|---|---|---|---|---|---|---|
| k = | −1.1432E+00 | −2.3615E+01 | −3.1613E+00 | −3.1040E+00 | −1.8911E+01 | 3.0000E+00 |
| A4 = | 2.4516E−02 | −4.5646E−02 | −3.6340E−01 | −3.4957E−01 | −1.5978E−01 | −8.8230E−02 |
| A6 = | 2.2490E−01 | 2.7998E−01 | 5.4276E−01 | 2.9498E−01 | 1.9181E−02 | −1.6167E−01 |
| A8 = | −4.5625E−01 | −9.2979E−02 | −1.0084E+00 | −1.8866E−01 | 1.4820E−01 | 7.9986E−03 |
| A10 = | 1.5998E−01 | −1.2815E+00 | 2.9526E−01 | −5.4625E−01 | −1.9173E−01 | −1.4040E−02 |
| A12 = | 9.5445E−01 | 6.6948E−01 | 1.4432E−02 | 6.9967E−01 | −1.0910E−01 | −7.2931E−03 |
| A14 = | −1.1811E+00 | −3.4243E−01 | −1.9141E+00 | 1.1117E−01 | 2.0918E−01 | −2.0349E−02 |

| Surface # | 8 | 9 | 10 | 11 | 12 | 13 |
|---|---|---|---|---|---|---|
| k = | −1.2230E+00 | −2.1117E+00 | −2.0257E−01 | −5.2017E+00 | −1.4581E+01 | −4.2152E+00 |
| A4 = | 3.0206E−01 | 1.1349E−01 | −1.6340E−01 | −5.0767E−02 | −1.5511E−01 | −8.2194E−02 |
| A6 = | −9.2088E−01 | −2.8585E−01 | 1.4228E−01 | −1.8256E−02 | 3.9870E−02 | 2.4293E−02 |
| A8 = | 1.1189E+00 | 3.2260E−01 | −9.0979E−02 | 1.0162E−01 | −5.8713E−03 | −6.2126E−03 |
| A10 = | −9.2264E−01 | −2.4528E−01 | 1.4952E−02 | −8.5942E−02 | 5.8716E−04 | 1.1026E−03 |
| A12 = | 6.1715E−01 | 1.3241E−01 | −1.2856E−04 | 2.6297E−02 | 1.7939E−04 | −1.2273E−04 |
| A14 = | −1.7102E−01 | −3.0569E−02 | 3.4923E−04 | −2.4964E−03 | −3.7940E−05 | 6.4882E−06 |

In the optical image system according to the 2nd embodiment, the definitions of f, Fno, HFOV, V1, V2, V4, V5, R7, R8, CT2, CT3, f1, f2, f3 and f4 are the same as those stated in the 1st embodiment with corresponding values for the 2nd embodiment. Moreover, these parameters can be calculated from Table 3 and Table 4 as the following values and satisfy the following relationships:

| f (mm) | 2.88 | (R7 − R8)/(R7 + R8) | −0.38 |
|---|---|---|---|
| Fno | 2.35 | f/f2 | 0.03 |
| HFOV (deg.) | 42.6 | f/f3 + |f/f4| | 1.94 |
| V1/V2 | 2.40 | (f1 − f3)/(f1 + f3) | 0.48 |
| V5/V4 | 2.40 | (f2 − f3)/(f2 + f3) | 0.93 |
| CT2/CT3 | 0.39 | | |

3rd Embodiment

Figure 5:
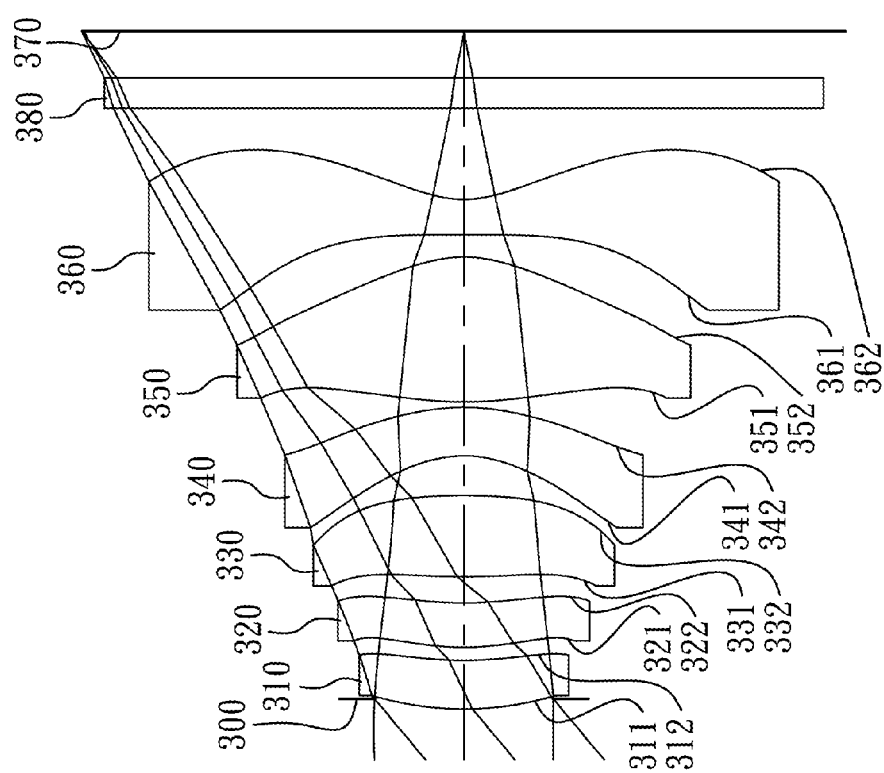
FIG. 5 is a schematic view of an optical image lens system according to the 3rd embodiment of the present disclosure.
Figure 6:
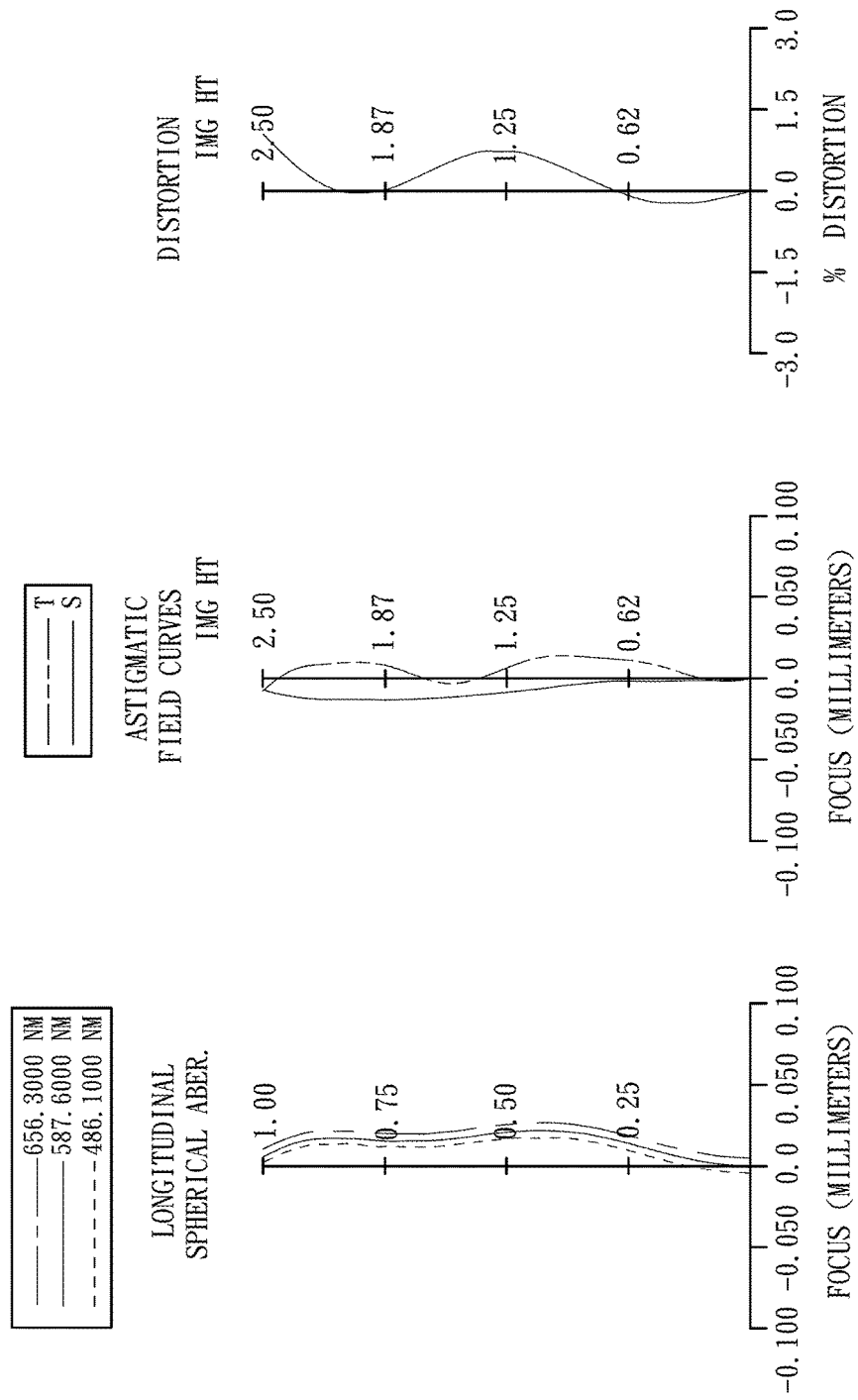
FIG. 6 shows spherical aberration curves, astigmatic field curves and a distortion curve of the optical image lens system according to the 3rd embodiment.

FIG. 5 is a schematic view of an optical image lens system according to the 3rd embodiment of the present disclosure. FIG. 6 shows spherical aberration curves, astigmatic field curves and a distortion curve of the optical image lens system according to the 3rd embodiment. In FIG. 5, the optical image lens system includes, in order from an object side to an image side, an aperture stop 300, a first lens element 310, a second lens element 320, a third lens element 330, a fourth lens element 340, a fifth lens element 350, a sixth lens element 360, an IR-cut filter 380 and an image plane 370.

The first lens element 310 with positive refractive power has a convex object-side surface 311 and a concave image-side surface 312. The first lens element 310 is made of plastic material and has the object-side surface 311 and the image-side surface 312 being aspheric.

The second lens element 320 with positive refractive power has a convex object-side surface 321 and a concave image-side surface 322. The second lens element 320 is made of plastic material and has the object-side surface 321 and the image-side surface 322 being aspheric.

The third lens element 330 with positive refractive power has a convex object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342. The fourth lens element 340 is made of plastic material and has the object-side surface 341 and the image-side surface 342 being aspheric.

The fifth lens element 350 with positive refractive power has a convex object-side surface 351 and a convex image-side surface 352. The fifth lens element 350 is made of plastic material and has the object-side surface 351 and the image-side surface 352 being aspheric.

The sixth lens element 360 with negative refractive power has a concave object-side surface 361 and a concave image-side surface 362. The sixth lens element 360 is made of plastic material and has the object-side surface 361 and the image-side surface 362 being aspheric. Furthermore, the sixth lens element 360 has inflection points on the image-side surface 362 thereof.

The IR-cut filter 380 is made of glass, and located between the sixth lens element 360 and the image plane 370, and will not affect the focal length of the optical image lens system.

The detailed optical data of the 3rd embodiment are shown in Table 5 and the aspheric surface data are shown in Table 6 below.

TABLE 5

3rd Embodiment
f = 2.94 mm, Fno = 2.50, HFOV = 40.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.066 | | | | |
| 2 | Lens 1 | 2.019 (ASP) | 0.320 | Plastic | 1.535 | 56.3 | 22.35 |
| 3 | | 2.295 (ASP) | 0.086 | | | | |
| 4 | Lens 2 | 1.639 (ASP) | 0.292 | Plastic | 1.535 | 56.3 | 9.22 |
| 5 | | 2.303 (ASP) | 0.172 | | | | |
| 6 | Lens 3 | 4.268 (ASP) | 0.535 | Plastic | 1.535 | 56.3 | 3.77 |
| 7 | | −3.649 (ASP) | 0.261 | | | | |
| 8 | Lens 4 | −0.757 (ASP) | 0.318 | Plastic | 1.650 | 21.4 | −2.95 |
| 9 | | −1.458 (ASP) | 0.036 | | | | |
| 10 | Lens 5 | 2.425 (ASP) | 0.954 | Plastic | 1.535 | 56.3 | 1.23 |
| 11 | | −0.781 (ASP) | 0.146 | | | | |
| 12 | Lens 6 | −95.114 (ASP) | 0.232 | Plastic | 1.535 | 56.3 | −1.20 |
| 13 | | 0.648 (ASP) | 0.600 | | | | |
| 14 | IR-cut filter | Plano | 0.200 | Glass | 1.517 | 64.2 | — |
| 15 | | Plano | 0.306 | | | | |
| 16 | Image | Plano | — | | | | |

Note:
Reference wavelength (d-line) is 587.6 nm.

In the optical image system according to the 3rd embodiment, the definitions of f, Fno, HFOV, V1, V2, V4, V5, R7, R8, CT2, CT3, f1, f2, f3 and f4 are the same as those stated in the 1st embodiment with corresponding values for the 3rd embodiment. Moreover, these parameters can be calculated from Table 5 and Table 6 as the following values and satisfy the following relationships:

| f (mm) | 2.94 | (R7 − R8)/(R7 + R8) | −0.32 |
|---|---|---|---|
| Fno | 2.50 | f/f2 | 0.32 |
| HFOV (deg.) | 40.0 | f/f3 + |f/f4| | 1.77 |
| V1/V2 | 1.00 | (f1 − f3)/(f1 + f3) | 0.71 |
| V5/V4 | 2.63 | (f2 − f3)/(f2 + f3) | 0.42 |
| CT2/CT3 | 0.55 | | |

4th Embodiment

Figure 7:
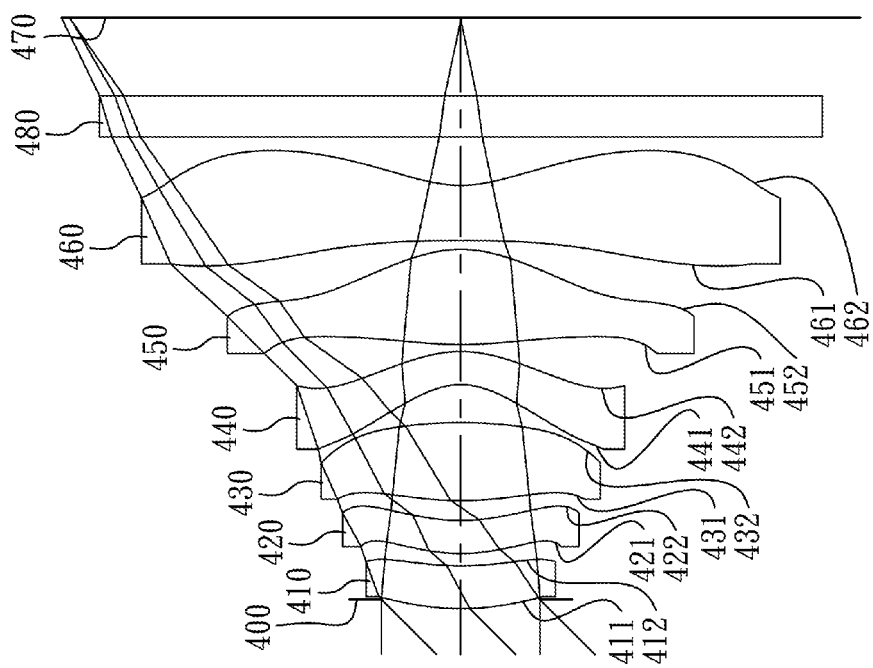
FIG. 7 is a schematic view of an optical image lens system according to the 4th embodiment of the present disclosure.
Figure 8:
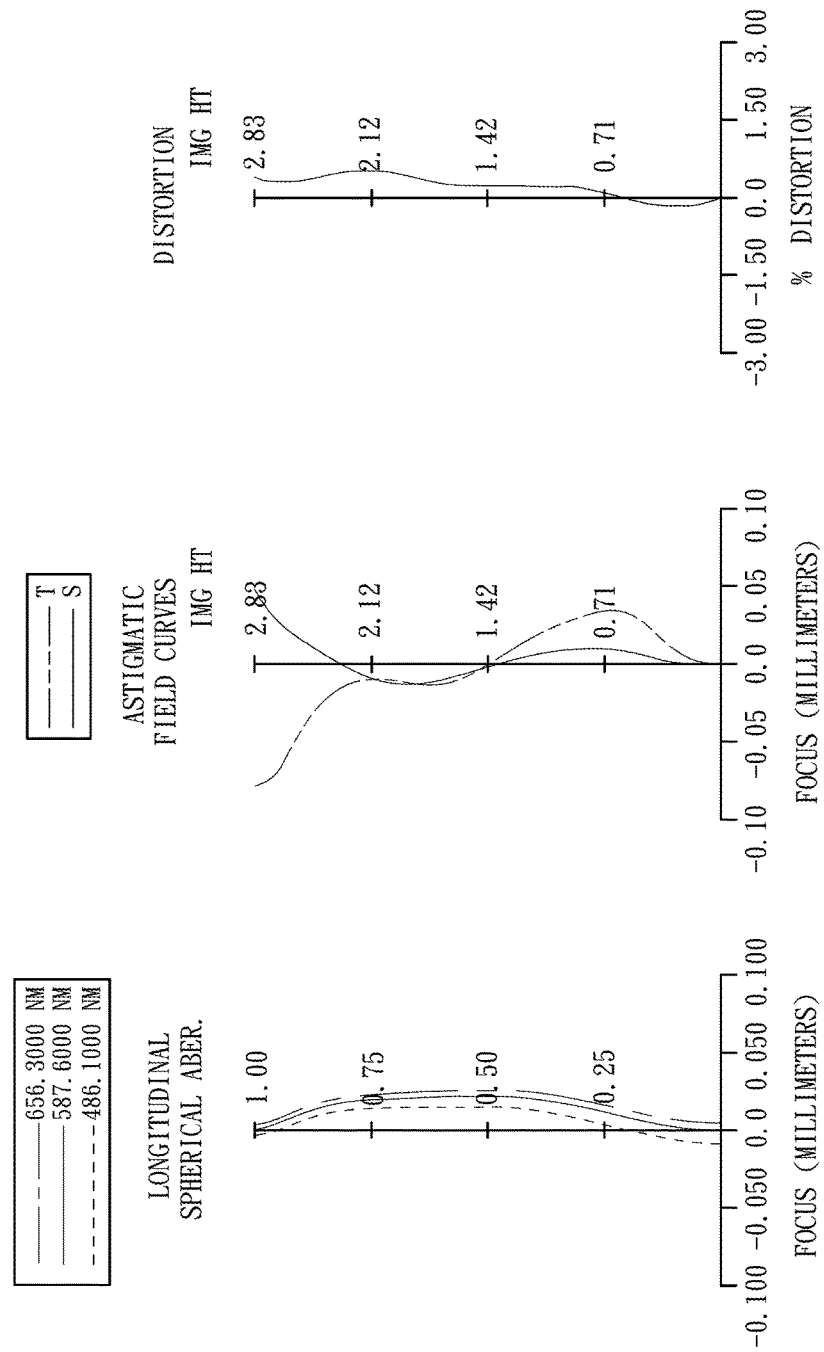
FIG. 8 shows spherical aberration curves, astigmatic field curves and a distortion curve of the optical image lens system according to the 4th embodiment.

FIG. 7 is a schematic view of an optical image lens system according to the 4th embodiment of the present disclosure. FIG. 8 shows spherical aberration curves, astigmatic field curves and a distortion curve of the optical image lens system according to the 4th embodiment. In FIG. 7, the optical image lens system includes, in order from an object side to an image side, an aperture stop 400, a first lens element 410, a second lens element 420, a third lens element 430, a fourth lens element 440, a fifth lens element 450, a sixth lens element 460, an IR-cut filter 480 and an image plane 470.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with positive refractive power has a convex object-side surface 421 and a concave image-side surface 422. The second lens element 420 is made of plastic material and has the object-side surface 421 and the image-side surface 422 being aspheric.

TABLE 6

Aspheric Coefficients

| Surface # | 2 | 3 | 4 | 5 | 6 | 7 |
|---|---|---|---|---|---|---|
| k = | −3.0326E+00 | −2.0000E+01 | −7.3636E+00 | −4.6612E+00 | −1.9780E+01 | 5.1915E+00 |
| A4 = | −1.5699E−02 | −1.3917E−01 | −2.8035E−01 | −2.8429E−01 | −1.8369E−01 | −7.1229E−02 |
| A6 = | 2.8981E−01 | 1.1866E−01 | 4.6914E−01 | 2.0186E−01 | −8.7536E−02 | −1.7794E−01 |
| A8 = | −1.0018E+00 | 9.6562E−03 | −1.1926E+00 | −2.6611E−01 | 1.0439E−01 | 5.4391E−02 |
| A10 = | 7.8263E−01 | −1.3584E+00 | 9.1184E−01 | 1.3883E−01 | −1.2512E−01 | 1.0047E−02 |
| A12 = | 2.0282E+00 | 9.3670E−01 | −1.1254E−01 | −2.6507E−01 | −9.8560E−02 | 3.8337E−03 |
| A14 = | −3.6199E+00 | −3.4243E−01 | −1.9141E+00 | 1.5258E−01 | 1.5770E−01 | −5.9692E−05 |

| Surface # | 8 | 9 | 10 | 11 | 12 | 13 |
|---|---|---|---|---|---|---|
| k = | −1.6939E+00 | −2.3770E+00 | −5.0705E+00 | −5.9220E+00 | −1.0000E+00 | −5.7800E+00 |
| A4 = | 3.4912E−01 | 1.4501E−01 | −1.6952E−01 | −2.8865E−02 | −1.4085E−01 | −7.5701E−02 |
| A6 = | −8.8791E−01 | −2.7334E−01 | 1.6077E−01 | −2.8480E−02 | 8.7043E−02 | 2.1023E−02 |
| A8 = | 1.1331E+00 | 3.2261E−01 | −9.3525E−02 | 1.0220E−01 | −6.5169E−03 | −5.8861E−03 |
| A10 = | −9.2398E−01 | −2.4985E−01 | 1.4659E−02 | −8.4239E−02 | 4.1222E−04 | 1.0882E−03 |
| A12 = | 5.8827E−01 | 1.2856E−01 | 9.9787E−04 | 2.6674E−02 | 2.0903E−04 | −9.7933E−05 |
| A14 = | −1.9567E−01 | −2.9324E−02 | 1.1209E−04 | −2.7428E−03 | −3.1115E−06 | 1.8267E−06 |

The third lens element 430 with positive refractive power has a convex object-side surface 431 and a convex image-side surface 432. The third lens element 430 is made of plastic material and has the object-side surface 431 and the image-side surface 432 being aspheric.

The fourth lens element 440 with negative refractive power has a concave object-side surface 441 and a convex image-side surface 442. The fourth lens element 440 is made of plastic material and has the object-side surface 441 and the image-side surface 442 being aspheric.

The fifth lens element 450 with positive refractive power has a convex object-side surface 451 and a convex image-side surface 452. The fifth lens element 450 is made of plastic material and has the object-side surface 451 and the image-side surface 452 being aspheric.

The sixth lens element 460 with negative refractive power has a concave object-side surface 461 and a concave image-side surface 462. The sixth lens element 460 is made of plastic material and has the object-side surface 461 and the image-side surface 462 being aspheric. Furthermore, the sixth lens element 460 has inflection points on the image-side surface 462 thereof.

The IR-cut filter 480 is made of glass, and located between the sixth lens element 460 and the image plane 470, and will not affect the focal length of the optical image lens system.

The detailed optical data of the 4th embodiment are shown in Table 7 and the aspheric surface data are shown in Table 8 below.

TABLE 7

4th Embodiment
f = 2.82 mm, Fno = 2.45, HFOV = 45.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.066 | | | | |
| 2 | Lens 1 | 1.919 | (ASP) | 0.309 | Plastic | 1.544 | 55.9 | 59.39 |
| 3 | | 1.925 | (ASP) | 0.090 | | | | |
| 4 | Lens 2 | 1.216 | (ASP) | 0.240 | Plastic | 1.544 | 55.9 | 13.22 |
| 5 | | 1.362 | (ASP) | 0.145 | | | | |
| 6 | Lens 3 | 2.366 | (ASP) | 0.565 | Plastic | 1.544 | 55.9 | 2.59 |
| 7 | | −3.191 | (ASP) | 0.276 | | | | |
| 8 | Lens 4 | −0.493 | (ASP) | 0.240 | Plastic | 1.640 | 23.3 | −2.35 |
| 9 | | −0.873 | (ASP) | 0.050 | | | | |
| 10 | Lens 5 | 2.573 | (ASP) | 0.692 | Plastic | 1.544 | 55.9 | 1.25 |
| 11 | | −0.837 | (ASP) | 0.064 | | | | |
| 12 | Lens 6 | −12.466 | (ASP) | 0.400 | Plastic | 1.544 | 55.9 | −1.46 |
| 13 | | 0.857 | (ASP) | 0.350 | | | | |
| 14 | IR-cut filter | Plano | | 0.300 | Glass | 1.517 | 64.2 | — |
| 15 | | Plano | | 0.568 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 | 6 | 7 |
|---|---|---|---|---|---|---|
| k = | −1.1304E+00 | −1.0000E+01 | −5.9733E+00 | −6.3151E+00 | −2.0594E+00 | −9.9189E+00 |
| A4 = | −4.6085E−02 | −2.7025E−01 | −2.3433E−01 | −1.5238E−01 | −1.5161E−01 | 1.0883E−02 |
| A6 = | 1.8770E−01 | 5.5202E−01 | 5.4339E−01 | 2.3689E−01 | −3.3209E−02 | −1.7866E−01 |
| A8 = | −4.9042E−01 | −1.0988E+00 | −1.5028E+00 | −4.8038E−01 | 2.6532E−02 | 1.4862E−03 |
| A10 = | −8.1943E−01 | −8.0919E−01 | 3.9319E−01 | 2.0965E−01 | −2.1772E−01 | −1.0334E−02 |
| A12 = | 4.3223E+00 | 6.6949E−01 | 2.6664E+00 | −4.7043E−01 | 6.4874E−02 | 1.0250E−02 |
| A14 = | −6.2030E+00 | −3.4243E−01 | −7.5558E+00 | 1.2032E−01 | 1.9868E−02 | 1.7371E−02 |

| Surface # | 8 | 9 | 10 | 11 | 12 | 13 |
|---|---|---|---|---|---|---|
| k = | −2.0028E+00 | −3.5513E+00 | −2.4274E+01 | −5.0525E+00 | −4.1613E+01 | −7.8941E+00 |
| A4 = | 4.3067E−01 | 1.6688E−01 | −1.6373E−01 | −4.2794E−02 | −6.4527E−02 | −7.8014E−02 |
| A6 = | −8.3071E−01 | −2.4687E−01 | 1.7289E−01 | 1.1889E−02 | 3.5162E−02 | 2.7325E−02 |
| A8 = | 1.1445E+00 | 3.4134E−01 | −9.1197E−02 | 1.0587E−01 | −6.7370E−03 | −6.8681E−03 |
| A10 = | −9.4459E−01 | −2.4418E−01 | 1.6490E−02 | −8.6392E−02 | 1.9348E−04 | 1.0402E−03 |
| A12 = | 5.7702E−01 | 1.1654E−01 | 1.8546E−04 | 2.5506E−02 | 1.0040E−04 | −1.2537E−04 |
| A14 = | −2.0758E−01 | −2.8446E−02 | −5.3761E−04 | −2.7260E−03 | −9.3161E−06 | 9.5624E−06 |

In the optical image system according to the 4th embodiment, the definitions of f, Fno, HFOV, V1, V2, V4, V5, R7, R8, CT2, CT3, f1, f2, f3 and f4 are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 2.82 | (R7 − R8)/(R7 + R8) | −0.28 |
| Fno | 2.45 | f/f2 | 0.21 |
| HFOV (deg.) | 45.0 | f/f3 + \|f/f4\| | 2.29 |
| V1/V2 | 1.00 | (f1 − f3)/(f1 + f3) | 0.92 |
| V5/V4 | 2.40 | (f2 − f3)/(f2 + f3) | 0.67 |
| CT2/CT3 | 0.42 | | |

5th Embodiment

Figure 9:
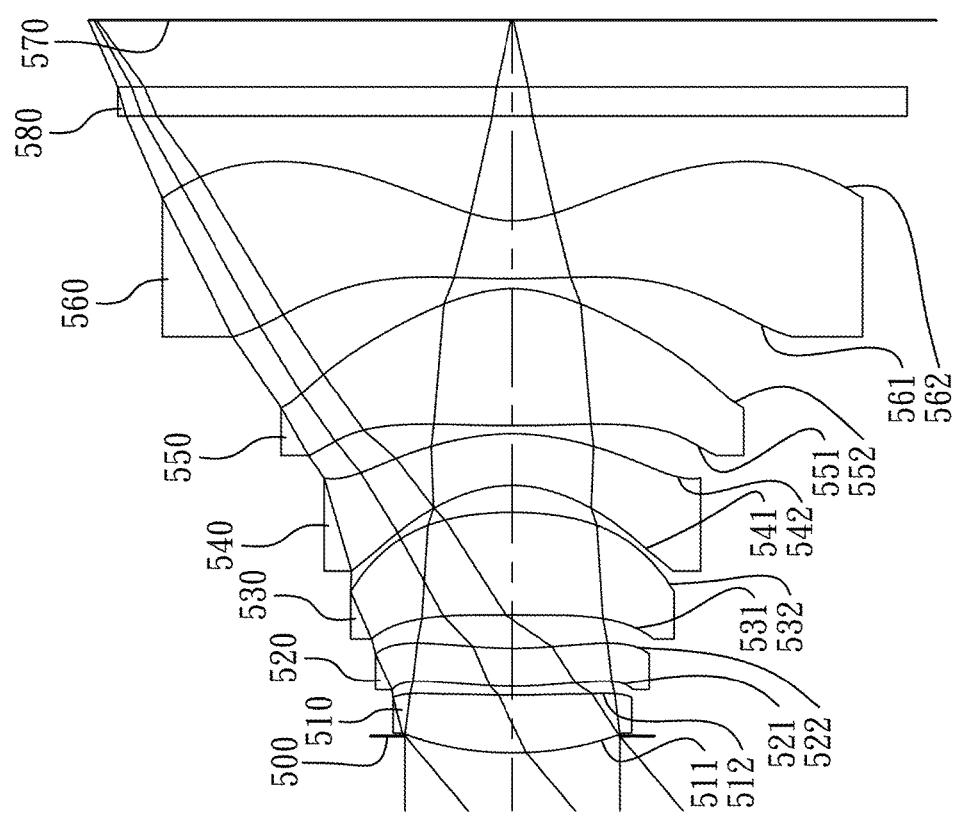
FIG. 9 is a schematic view of an optical image lens system according to the 5th embodiment of the present disclosure.
Figure 10:
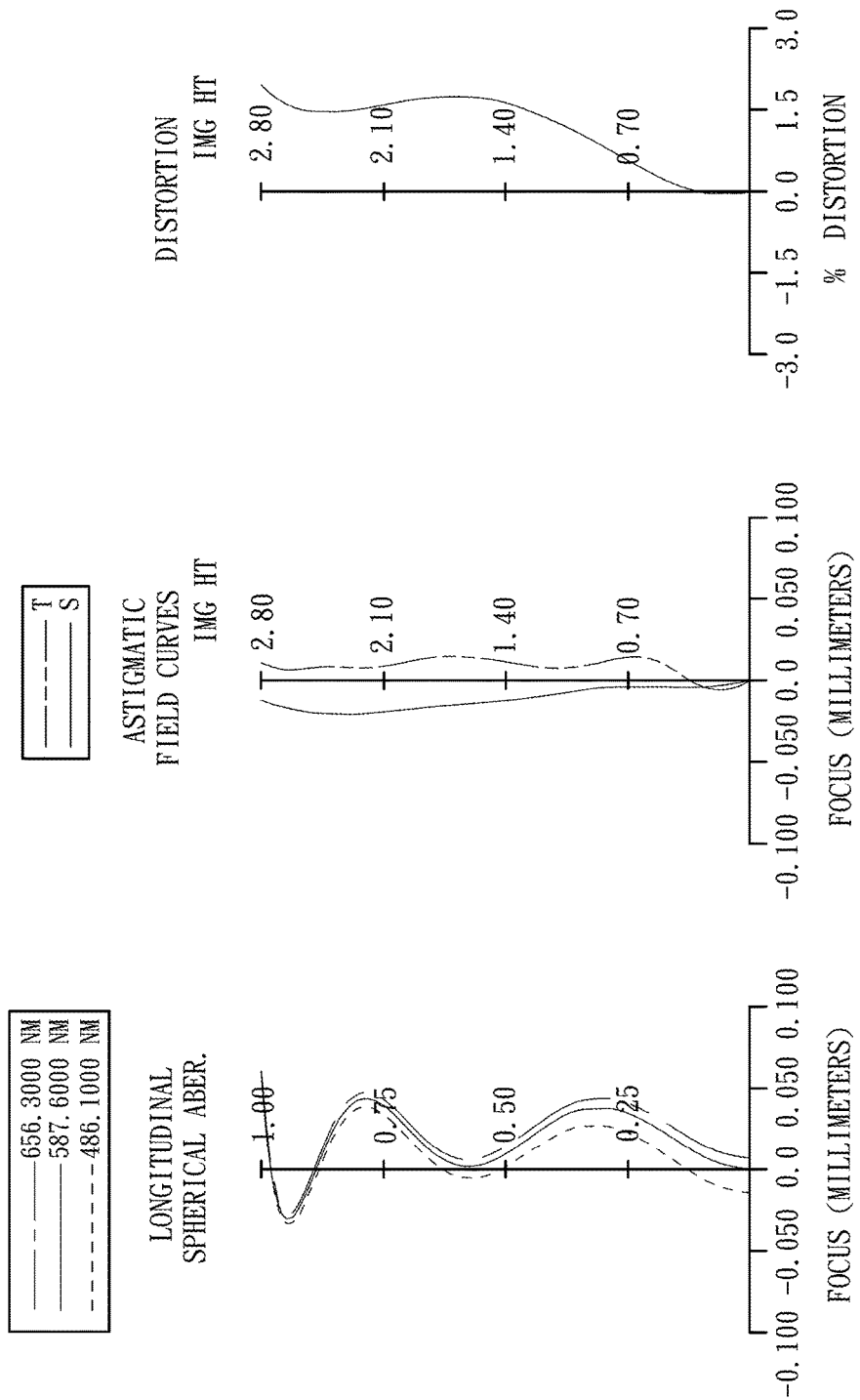
FIG. 10 shows spherical aberration curves, astigmatic field curves and a distortion curve of the optical image lens system according to the 5th embodiment.

FIG. 9 is a schematic view of an optical image lens system according to the 5th embodiment of the present disclosure. FIG. 10 shows spherical aberration curves, astigmatic field curves and a distortion curve of the optical image lens system according to the 5th embodiment. In FIG. 9, the optical image lens system includes, in order from an object side to an image side, an aperture stop 500, a first lens element 510, a second lens element 520, a third lens element 530, a fourth lens element 540, a fifth lens element 550, a sixth lens element 560, an IR-cut filter 580 and an image plane 570.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with positive refractive power has a convex object-side surface 521 and a concave image-side surface 522. The second lens element 520 is made of plastic material and has the object-side surface 521 and the image-side surface 522 being aspheric.

The third lens element 530 with positive refractive power has a concave object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with positive refractive power has a convex object-side surface 551 and a convex image-side surface 552. The fifth lens element 550 is made of plastic material and has the object-side surface 551 and the image-side surface 552 being aspheric.

The sixth lens element 560 with negative refractive power has a convex object-side surface 561 and a concave image-side surface 562. The sixth lens element 560 is made of plastic material and has the object-side surface 561 and the image-side surface 562 being aspheric. Furthermore, the sixth lens element 560 has inflection points on the image-side surface 562 thereof.

The IR-cut filter 580 is made of glass, and located between the sixth lens element 560 and the image plane 570, and will not affect the focal length of the optical image lens system.

The detailed optical data of the 5th embodiment are shown in Table 9 and the aspheric surface data are shown in Table 10 below.

TABLE 9

5th Embodiment
f = 3.24 mm, Fno = 2.25, HFOV = 40.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.112 | | | | |
| 2 | Lens 1 | 2.233 (ASP) | 0.387 | Plastic | 1.535 | 56.3 | 5.81 |
| 3 | | 7.446 (ASP) | 0.060 | | | | |
| 4 | Lens 2 | 2.651 (ASP) | 0.256 | Plastic | 1.633 | 23.4 | 42.00 |
| 5 | | 2.835 (ASP) | 0.224 | | | | |
| 6 | Lens 3 | −28.571 (ASP) | 0.686 | Plastic | 1.535 | 56.3 | 4.22 |
| 7 | | −2.108 (ASP) | 0.180 | | | | |
| 8 | Lens 4 | −0.823 (ASP) | 0.345 | Plastic | 1.633 | 23.4 | −3.33 |
| 9 | | −1.570 (ASP) | 0.053 | | | | |
| 10 | Lens 5 | 6.091 (ASP) | 0.921 | Plastic | 1.535 | 56.3 | 1.48 |
| 11 | | −0.859 (ASP) | 0.067 | | | | |
| 12 | Lens 6 | 6.823 (ASP) | 0.387 | Plastic | 1.535 | 56.3 | −1.52 |
| 13 | | 0.710 (ASP) | 0.700 | | | | |
| 14 | IR-cut filter | Plano | 0.200 | Glass | 1.517 | 64.2 | — |
| 15 | | Plano | 0.444 | | | | |
| 16 | Image | Plano | — | | | | |

Note:
Reference wavelength (d-line) is 587.6 nm.

TABLE 10

Aspheric Coefficients

| Surface # | 2 | 3 | 4 | 5 | 6 | 7 |
|---|---|---|---|---|---|---|
| k = | −2.2134E+00 | −1.6024E+01 | −2.0000E+01 | −2.8509E+00 | −1.0000E+00 | 4.6261E−01 |
| A4 = | 4.2222E−03 | −1.9156E−01 | −2.9127E−01 | −2.7784E−01 | −1.3537E−01 | −4.5900E−02 |
| A6 = | 4.3401E−01 | 1.9053E−01 | 5.7747E−01 | 2.2287E−01 | −3.8550E−02 | −1.6872E−01 |
| A8 = | −1.5917E+00 | 6.5246E−01 | −1.0863E+00 | −1.9672E−01 | 1.2037E−01 | 5.7257E−02 |
| A10 = | 1.7060E+00 | −1.5698E+00 | 1.1754E+00 | 1.0448E−01 | −1.5649E−01 | 1.5621E−02 |
| A12 = | 2.0282E+00 | 6.6955E−01 | 1.4439E−02 | −2.7001E−01 | −1.1287E−01 | −2.1144E−03 |
| A14 = | −3.6199E+00 | −3.4243E−01 | −1.9141E+00 | 1.1110E−01 | 1.2615E−01 | −7.7322E−03 |

| Surface # | 8 | 9 | 10 | 11 | 12 | 13 |
|---|---|---|---|---|---|---|
| k = | −1.3111E+00 | −1.9309E+00 | −1.9773E+01 | −4.7709E+00 | −1.0000E+00 | −4.6524E+00 |
| A4 = | 3.2307E−01 | 1.3518E−01 | −1.7326E−01 | −5.8048E−02 | −1.3872E−01 | −7.5707E−02 |
| A6 = | −8.9506E−01 | −2.7409E−01 | 1.4917E−01 | −3.4956E−02 | 3.9401E−02 | 2.4043E−02 |
| A8 = | 1.1320E+00 | 3.2450E−01 | −9.7622E−02 | 1.0410E−01 | −7.2971E−03 | −6.1049E−03 |

TABLE 10-continued

| Aspheric Coefficients | | | | | | |
|---|---|---|---|---|---|---|
| A10 = | −9.2436E−01 | −2.4822E−01 | 1.4582E−02 | −8.3531E−02 | 6.5865E−04 | 1.0253E−03 |
| A12 = | 5.9454E−01 | 1.2890E−01 | 2.3164E−03 | 2.6542E−02 | 1.7220E−04 | −1.0923E−04 |
| A14 = | −1.9054E−01 | −2.8163E−02 | 7.8494E−04 | −2.7389E−03 | −3.1458E−05 | 5.5298E−06 |

In the optical image system according to the 5th embodiment, the definitions of f, Fno, HFOV, V1, V2, V4, V5, R7, R8, CT2, CT3, f1, f2, f3 and f4 are the same as those stated in the 1st embodiment with corresponding values for the 5th embodiment. Moreover, these parameters can be calculated from Table 9 and Table 10 as the following values and satisfy the following relationships:

| f (mm) | 3.24 | (R7 − R8)/(R7 + R8) | −0.31 |
|---|---|---|---|
| Fno | 2.25 | f/f2 | 0.08 |
| HFOV (deg.) | 40.2 | f/f3 + |f/f4| | 1.74 |
| V1/V2 | 2.41 | (f1 − f3)/(f1 + f3) | 0.16 |
| V5/V4 | 2.41 | (f2 − f3)/(f2 + f3) | 0.82 |
| CT2/CT3 | 0.37 | | |

6th Embodiment

Figure 11:
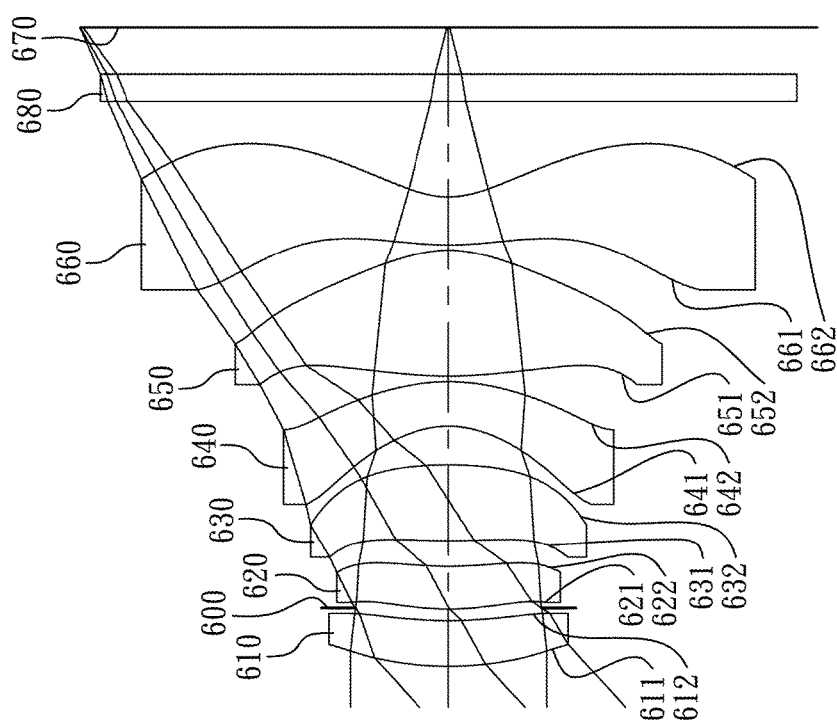
FIG. 11 is a schematic view of an optical image lens system according to the 6th embodiment of the present disclosure.
Figure 12:
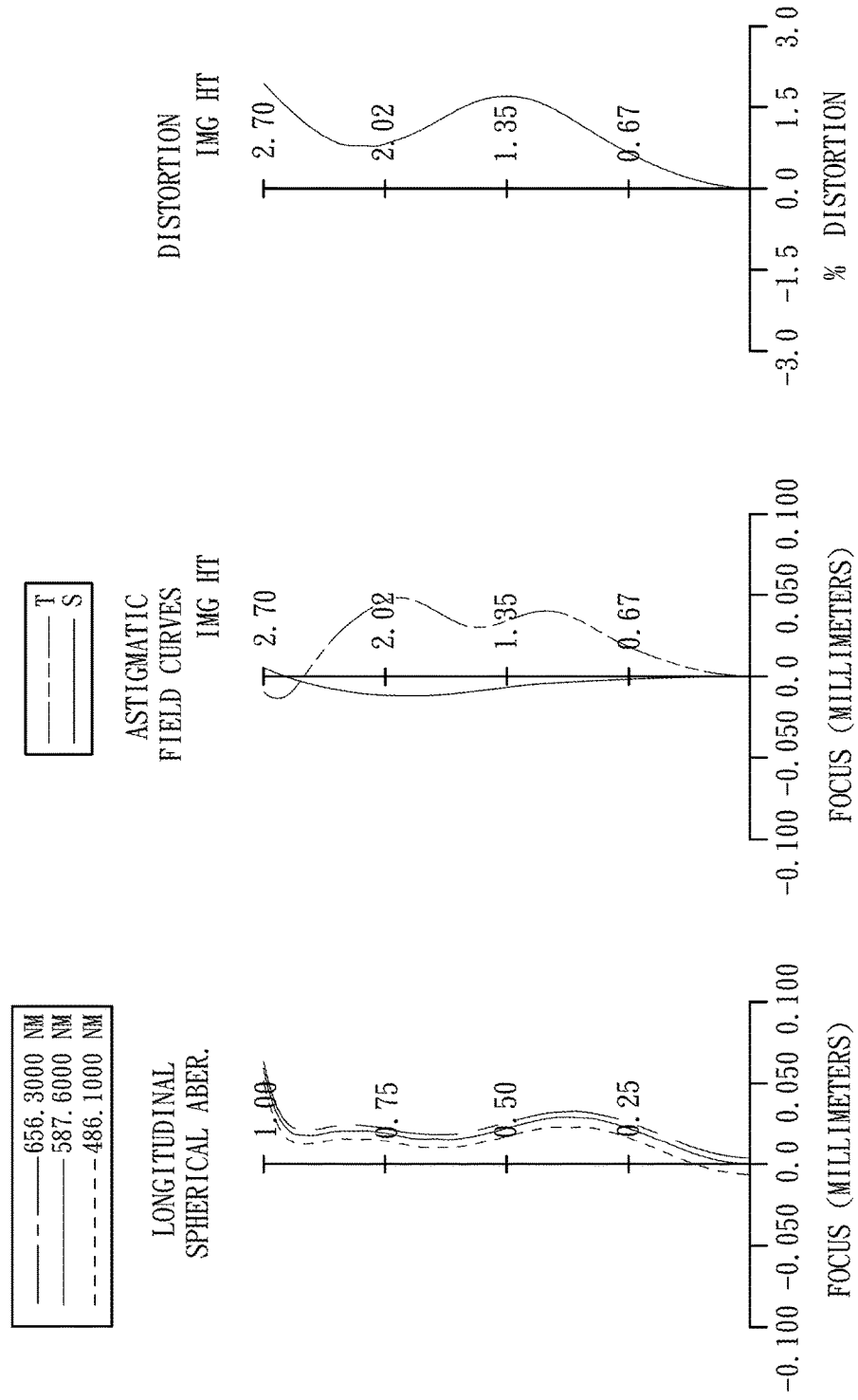
FIG. 12 shows spherical aberration curves, astigmatic field curves and a distortion curve of the optical image lens system according to the 6th embodiment.

FIG. 11 is a schematic view of an optical image lens system according to the 6th embodiment of the present disclosure. FIG. 12 shows spherical aberration curves, astigmatic field curves and a distortion curve of the optical image lens system according to the 6th embodiment. In FIG. 11, the optical image lens system includes, in order from an object side to an image side, a first lens element 610, an aperture stop 600, a second lens element 620, a third lens element 630, a fourth lens element 640, a fifth lens element 650, a sixth lens element 660, an IR-cut filter 680 and an image plane 670.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with positive refractive power has a convex object-side surface 621 and a concave image-side surface 622. The second lens element 620 is made of plastic material and has the object-side surface 621 and the image-side surface 622 being aspheric.

The third lens element 630 with positive refractive power has a convex object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with positive refractive power has a convex object-side surface 651 and a convex image-side surface 652. The fifth lens element 650 is made of plastic material and has the object-side surface 651 and the image-side surface 652 being aspheric.

The sixth lens element 660 with negative refractive power has a convex object-side surface 661 and a concave image-side surface 662. The sixth lens element 660 is made of plastic material and has the object-side surface 661 and the image-side surface 662 being aspheric. Furthermore, the sixth lens element 660 has inflection points on the image-side surface 662 thereof.

The IR-cut filter 680 is made of glass, and located between the sixth lens element 660 and the image plane 670, and will not affect the focal length of the optical image lens system.

The detailed optical data of the 6th embodiment are shown in Table 11 and the aspheric surface data are shown in Table 12 below.

TABLE 11

6th Embodiment
f = 2.88 mm, Fno = 2.00, HFOV = 42.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.427 | (ASP) | 0.334 | Plastic | 1.544 | 55.9 | 27.01 |
| 2 | | 2.766 | (ASP) | 0.093 | | | | |
| 3 | Ape. Stop | Plano | | −0.008 | | | | |
| 4 | Lens 2 | 1.803 | (ASP) | 0.314 | Plastic | 1.544 | 55.9 | 9.03 |
| 5 | | 2.674 | (ASP) | 0.189 | | | | |
| 6 | Lens 3 | 6.182 | (ASP) | 0.557 | Plastic | 1.544 | 55.9 | 3.59 |
| 7 | | −2.763 | (ASP) | 0.283 | | | | |
| 8 | Lens 4 | −0.717 | (ASP) | 0.326 | Plastic | 1.640 | 23.3 | −2.68 |
| 9 | | −1.451 | (ASP) | 0.041 | | | | |
| 10 | Lens 5 | 3.008 | (ASP) | 0.923 | Plastic | 1.544 | 55.9 | 1.37 |
| 11 | | −0.883 | (ASP) | 0.040 | | | | |
| 12 | Lens 6 | 2.506 | (ASP) | 0.352 | Plastic | 1.544 | 55.9 | −1.62 |
| 13 | | 0.621 | (ASP) | 0.700 | | | | |
| 14 | IR-cut filter | Plano | | 0.200 | Glass | 1.517 | 64.2 | — |
| 15 | | Plano | | 0.341 | | | | |
| 16 | Image | Plano | | — | | | | |

Note:
Reference wavelength (d-line) is 587.6 nm.

TABLE 12

| Aspheric Coefficients | | | | | | |
|---|---|---|---|---|---|---|
| Surface # | 1 | 2 | 4 | 5 | 6 | 7 |
| k = | −3.8085E+00 | −3.0000E+01 | −9.0861E+00 | −1.7410E+00 | −2.7059E+01 | 2.9900E+00 |
| A4 = | −3.9228E−03 | −1.3602E−01 | −3.3470E−01 | −3.5088E−01 | −1.9191E−01 | −9.1534E−02 |
| A6 = | 2.3564E−01 | 4.8375E−01 | 8.3572E−01 | 8.5410E−02 | −6.4661E−02 | −1.5909E−01 |
| A8 = | −4.2724E−01 | −4.9739E−01 | −2.0042E+00 | 2.1743E−02 | −7.0699E−02 | 8.3937E−03 |

TABLE 12-continued

| Aspheric Coefficients | | | | | | |
|---|---|---|---|---|---|---|
| A10 = | 1.1015E−01 | −5.1658E−01 | 1.8188E+00 | −7.3329E−01 | −9.9376E−02 | 4.5093E−02 |
| A12 = | 6.0247E−01 | 6.6948E−01 | 1.4431E−02 | 5.8596E−01 | −9.8247E−02 | 9.6460E−03 |
| A14 = | −6.0201E−01 | −3.4243E−01 | −1.9141E+00 | 1.1117E−01 | 2.0918E−01 | −2.4173E−02 |

| Surface # | 8 | 9 | 10 | 11 | 12 | 13 |
|---|---|---|---|---|---|---|
| k = | −1.3919E+00 | −2.0077E+00 | 2.1467E−02 | −6.2136E+00 | −1.3254E+01 | −4.3006E+00 |
| A4 = | 3.0790E−01 | 1.2895E−01 | −1.5511E−01 | −3.8790E−02 | −1.6340E−01 | −8.9174E−02 |
| A6 = | −9.2923E−01 | −2.7331E−01 | 1.3175E−01 | −2.3197E−02 | 4.1537E−02 | 2.5877E−02 |
| A8 = | 1.1603E+00 | 3.1410E−01 | −8.2269E−02 | 9.9599E−02 | −5.5056E−02 | −6.3285E−03 |
| A10 = | −8.8469E−01 | −2.5029E−01 | 1.2617E−02 | −8.5141E−02 | 4.9665E−04 | 1.1102E−03 |
| A12 = | 5.8112E−01 | 1.3273E−01 | −2.0471E−03 | 2.6521E−02 | 1.6478E−04 | −1.2730E−04 |
| A14 = | −1.8582E−01 | −2.7679E−02 | 1.3122E−03 | −2.6188E−03 | −3.4486E−05 | 7.0526E−06 |

In the optical image system according to the 6th embodiment, the definitions of f, Fno, HFOV, V1, V2, V4, V5, R7, R8, CT2, CT3, f1, f2, f3 and f4 are the same as those stated in the 1st embodiment with corresponding values for the 6th embodiment. Moreover, these parameters can be calculated from Table 11 and Table 12 as the following values and satisfy the following relationships:

| f (mm) | 2.88 | (R7 − R8)/(R7 + R8) | −0.34 |
|---|---|---|---|
| Fno | 2.00 | f/f2 | 0.32 |
| HFOV (deg.) | 42.5 | f/f3 + |f/f4| | 1.88 |
| V1/V2 | 1.00 | (f1 − f3)/(f1 + f3) | 0.77 |
| V5/V4 | 2.40 | (f2 − f3)/(f2 + f3) | 0.43 |
| CT2/CT3 | 0.56 | | |

7th Embodiment

Figure 13:
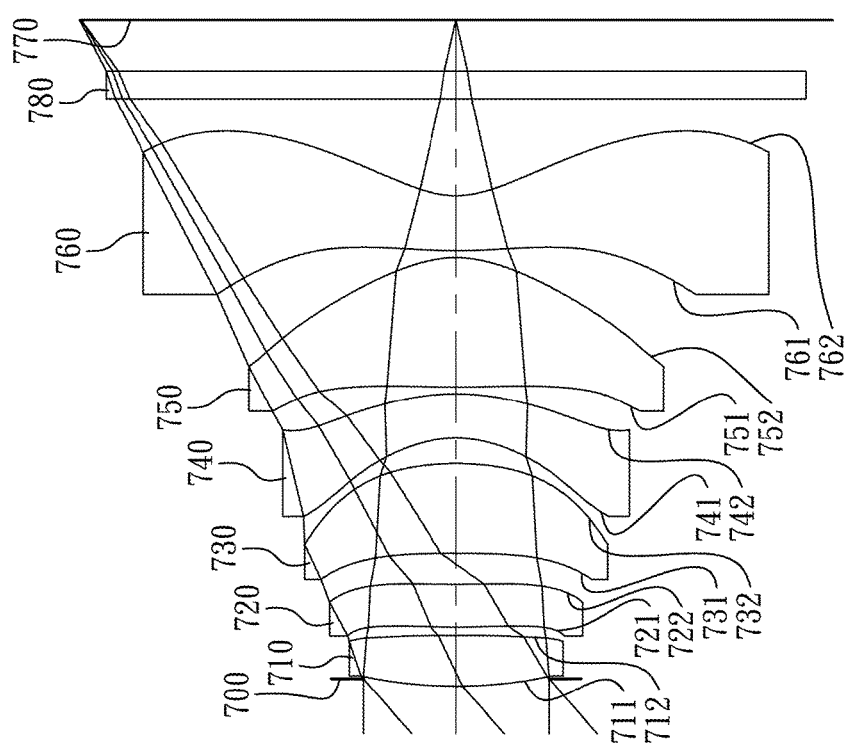
FIG. 13 is a schematic view of an optical image lens system according to the 7th embodiment of the present disclosure.
Figure 14:
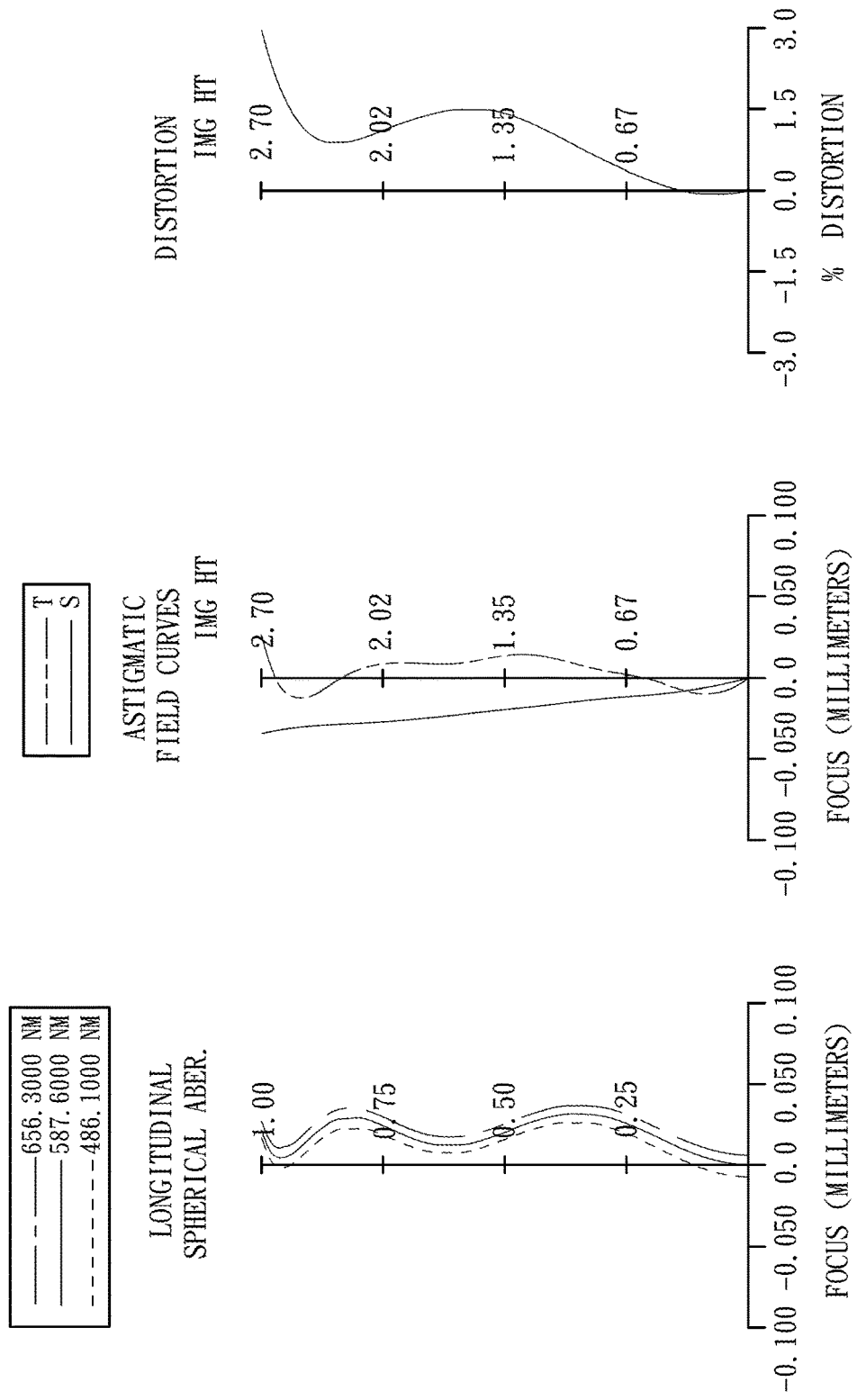
FIG. 14 shows spherical aberration curves, astigmatic field curves and a distortion curve of the optical image lens system according to the 7th embodiment.

FIG. 13 is a schematic view of an optical image lens system according to the 7th embodiment of the present disclosure. FIG. 14 shows spherical aberration curves, astigmatic field curves and a distortion curve of the optical image lens system according to the 7th embodiment. In FIG. 13, the optical image lens system includes, in order from an object side to an image side, an aperture stop 700, a first lens element 710, a second lens element 720, a third lens element 730, a fourth lens element 740, a fifth lens element 750, a sixth lens element 760, an IR-cut filter 780 and an image plane 770.

The first lens element 710 with positive refractive power has a convex object-side surface 711 and a convex image-side surface 712. The first lens element 710 is made of plastic material and has the object-side surface 711 and the image-side surface 712 being aspheric.

The second lens element 720 with positive refractive power has a convex object-side surface 721 and a concave image-side surface 722. The second lens element 720 is made of plastic material and has the object-side surface 721 and the image-side surface 722 being aspheric.

The third lens element 730 with positive refractive power has a concave object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with positive refractive power has a convex object-side surface 751 and a convex image-side surface 752. The fifth lens element 750 is made of plastic material and has the object-side surface 751 and the image-side surface 752 being aspheric.

The sixth lens element 760 with negative refractive power has a convex object-side surface 761 and a concave image-side surface 762. The sixth lens element 760 is made of plastic material and has the object-side surface 761 and the image-side surface 762 being aspheric. Furthermore, the sixth lens element 760 has inflection points on the image-side surface 762 thereof.

The IR-cut filter 780 is made of glass, and located between the sixth lens element 760 and the image plane 770, and will not affect the focal length of the optical image lens system.

The detailed optical data of the 7th embodiment are shown in Table 13 and the aspheric surface data are shown in Table 14 below.

TABLE 13

7th Embodiment
f = 3.01 mm, Fno = 2.25, HFOV = 41.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.055 | | | | |
| 2 | Lens 1 | 3.289 (ASP) | 0.366 | Plastic | 1.544 | 55.9 | 5.29 |
| 3 | | −22.202 (ASP) | 0.060 | | | | |
| 4 | Lens 2 | 5.626 (ASP) | 0.307 | Plastic | 1.650 | 21.4 | 30.37 |
| 5 | | 7.702 (ASP) | 0.224 | | | | |
| 6 | Lens 3 | −9.496 (ASP) | 0.646 | Plastic | 1.544 | 55.9 | 4.13 |
| 7 | | −1.860 (ASP) | 0.183 | | | | |
| 8 | Lens 4 | −0.859 (ASP) | 0.318 | Plastic | 1.650 | 21.4 | −3.25 |
| 9 | | −1.660 (ASP) | 0.050 | | | | |
| 10 | Lens 5 | 8.398 (ASP) | 0.932 | Plastic | 1.535 | 56.3 | 1.42 |
| 11 | | −0.802 (ASP) | 0.050 | | | | |
| 12 | Lens 6 | 4.282 (ASP) | 0.394 | Plastic | 1.544 | 55.9 | −1.43 |
| 13 | | 0.637 (ASP) | 0.700 | | | | |
| 14 | IR-cut filter | Plano | 0.200 | Glass | 1.517 | 64.2 | — |
| 15 | | Plano | 0.367 | | | | |
| 16 | Image | Plano | — | | | | |

Note:
Reference wavelength (d-line) is 587.6 nm.

TABLE 14

Aspheric Coefficients

| Surface # | 2 | 3 | 4 | 5 | 6 | 7 |
|---|---|---|---|---|---|---|
| k = | −4.8914E+00 | −1.8951E+01 | −1.8109E+01 | −3.0257E+01 | −1.0000E+00 | 4.1904E−01 |
| A4 = | −2.1717E−02 | −1.4581E−01 | −3.4042E−01 | −2.8730E−01 | −1.4487E−01 | −4.0908E−02 |
| A6 = | 3.7776E−01 | 2.2475E−01 | 6.0346E−01 | 1.4689E−01 | −4.1175E−02 | −1.7739E−01 |
| A8 = | −1.2572E+00 | 5.1629E−01 | −1.1028E+00 | −1.5281E−01 | 1.6282E−01 | 5.5016E−02 |
| A10 = | 1.2828E+00 | −1.5021E+00 | 1.0447E+00 | 1.7001E−01 | −1.4313E−01 | 1.0562E−02 |
| A12 = | 2.0285E+00 | 6.6943E−01 | 1.4500E−02 | −2.7007E−01 | −1.1288E−01 | 6.3826E−03 |
| A14 = | −3.6199E+00 | −3.4243E−01 | −1.9141E+00 | 1.1109E−01 | 1.2614E−01 | −2.8492E−03 |

| Surface # | 8 | 9 | 10 | 11 | 12 | 13 |
|---|---|---|---|---|---|---|
| k = | −1.1923E+00 | −1.8478E+00 | −7.1831E−01 | −4.6056E+00 | −1.0000E+00 | −4.1802E+00 |
| A4 = | 3.1140E−01 | 1.3811E−01 | −1.6735E−01 | −6.2510E−02 | −1.5380E−01 | −7.1268E−02 |
| A6 = | −8.9666E−01 | −2.6923E−01 | 1.5170E−01 | −3.3239E−02 | 4.1056E−02 | 2.2822E−02 |
| A8 = | 1.1380E+00 | 3.2722E−01 | −9.8712E−02 | 1.0486E−01 | −6.7412E−03 | −5.9391E−03 |
| A10 = | −9.2370E−01 | −2.4821E−01 | 1.4072E−02 | −8.3534E−02 | 5.7624E−04 | 1.0578E−03 |
| A12 = | 5.9689E−01 | 1.2839E−01 | 2.5468E−03 | 2.6443E−02 | 1.0584E−04 | −1.3056E−04 |
| A14 = | −1.8309E−01 | −2.8692E−02 | 8.3197E−04 | −2.7349E−03 | −3.1632E−05 | 8.0021E−06 |

In the optical image system according to the 7th embodiment, the definitions of f, Fno, HFOV, V1, V2, V4, V5, R7, R8, CT2, CT3, f1, f2, f3 and f4 are the same as those stated in the 1st embodiment with corresponding values for the 7th embodiment. Moreover, these parameters can be calculated from Table 13 and Table 14 as the following values and satisfy the following relationships:

| f (mm) | 3.01 | (R7 − R8)/(R7 + R8) | −0.32 |
|---|---|---|---|
| Fno | 2.25 | f/f2 | 0.10 |
| HFOV (deg.) | 41.0 | f/f3 + |f/f4| | 1.66 |
| V1/V2 | 2.61 | (f1 − f3)/(f1 + f3) | 0.12 |
| V5/V4 | 2.63 | (f2 − f3)/(f2 + f3) | 0.76 |
| CT2/CT3 | 0.48 | | |

8th Embodiment

Figure 15:
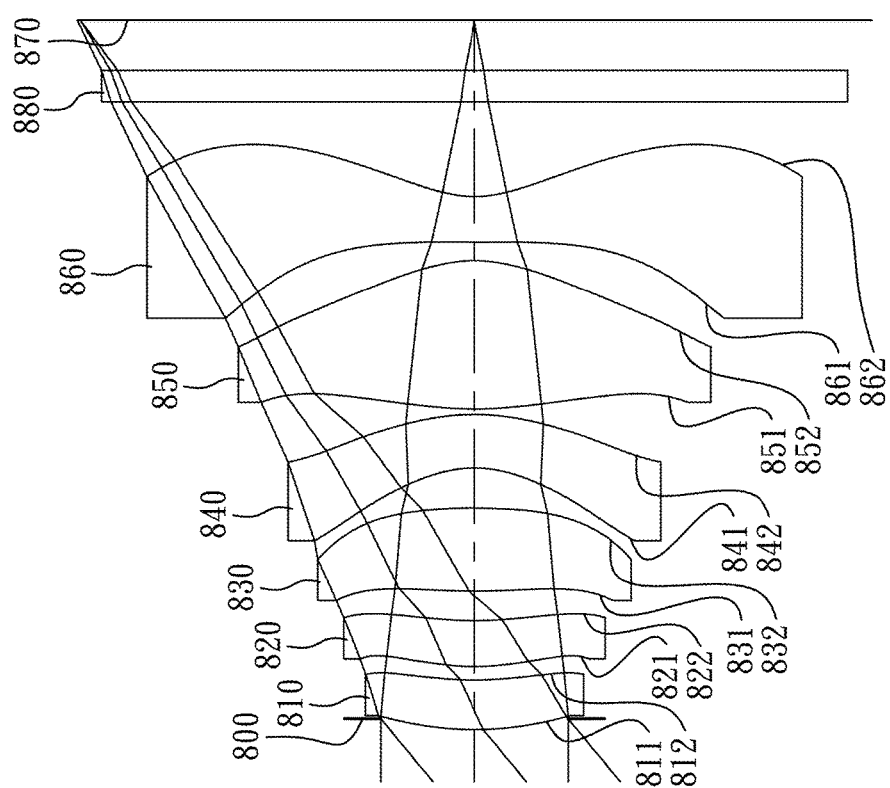
FIG. 15 is a schematic view of an optical image lens system according to the 8th embodiment of the present disclosure.
Figure 16:
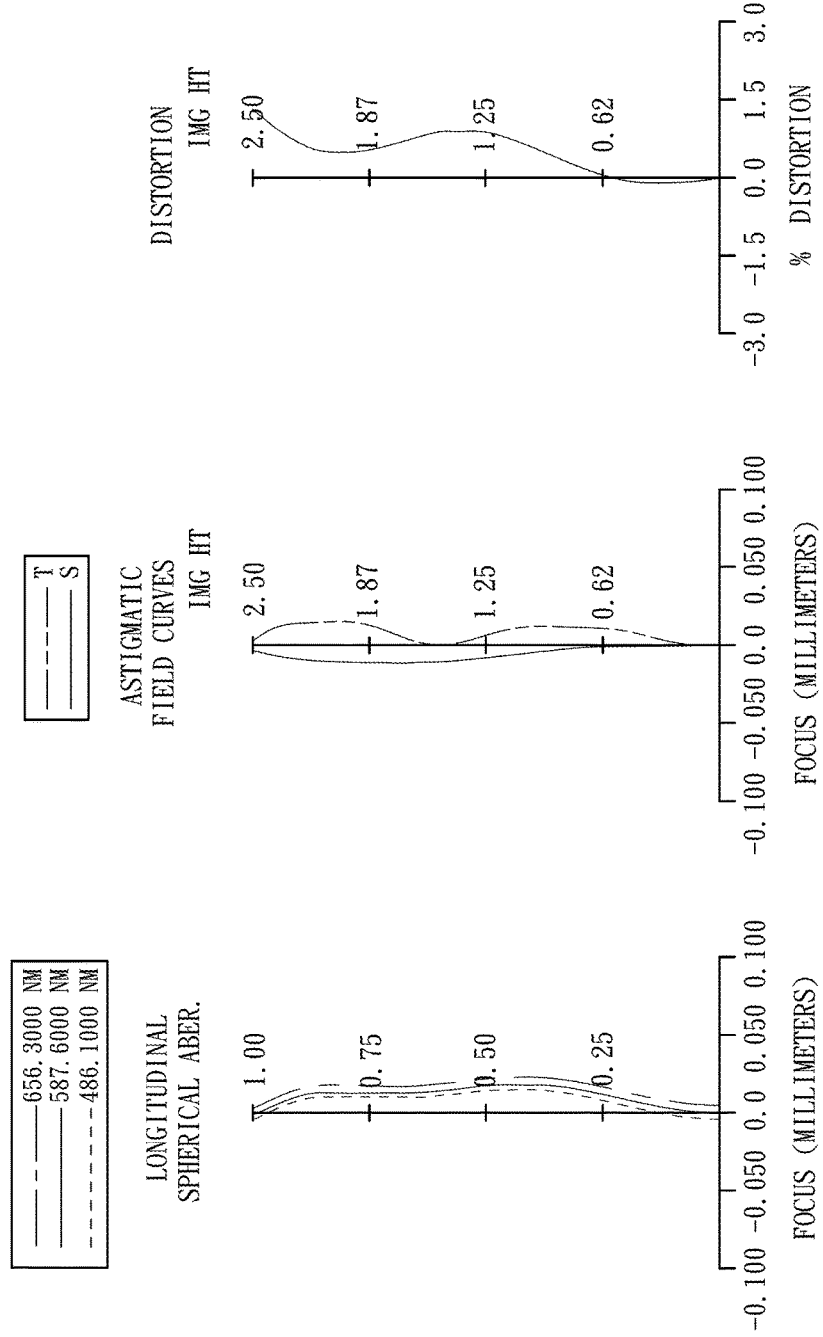
FIG. 16 shows spherical aberration curves, astigmatic field curves and a distortion curve of the optical image lens system according to the 8th embodiment.

FIG. 15 is a schematic view of an optical image lens system according to the 8th embodiment of the present disclosure. FIG. 16 shows spherical aberration curves, astigmatic field curves and a distortion curve of the optical image lens system according to the 8th embodiment. In FIG. 15, the optical image lens system includes, in order from an object side to an image side, an aperture stop 800, a first lens element 810, a second lens element 820, a third lens element 830, a fourth lens element 840, a fifth lens element 850, a sixth lens element 860, an IR-cut filter 880 and an image plane 870.

The first lens element 810 with positive refractive power has a convex object-side surface 811 and a concave image-side surface 812. The first lens element 810 is made of plastic material and has the object-side surface 811 and the image-side surface 812 being aspheric.

The second lens element 820 with positive refractive power has a convex object-side surface 821 and a concave image-side surface 822. The second lens element 820 is made of plastic material and has the object-side surface 821 and the image-side surface 822 being aspheric.

The third lens element 830 with positive refractive power has a convex object-side surface 831 and a convex image-side surface 832. The third lens element 830 is made of plastic material and has the object-side surface 831 and the image-side surface 832 being aspheric.

The fourth lens element 840 with negative refractive power has a concave object-side surface 841 and a convex image-side surface 842. The fourth lens element 840 is made of plastic material and has the object-side surface 841 and the image-side surface 842 being aspheric.

The fifth lens element 850 with positive refractive power has a convex object-side surface 851 and a convex image-side surface 852. The fifth lens element 850 is made of plastic material and has the object-side surface 851 and the image-side surface 852 being aspheric.

The sixth lens element 860 with negative refractive power has a planar object-side surface 861 and a concave image-side surface 862. The sixth lens element 860 is made of plastic material and has the object-side surface 861 and the image-side surface 862 being aspheric. Furthermore, the sixth lens element 860 has inflection points on the image-side surface 862 thereof.

The IR-cut filter 880 is made of glass, and located between the sixth lens element 860 and the image plane 870, and will not affect the focal length of the optical image lens system.

The detailed optical data of the 8th embodiment are shown in Table 15 and the aspheric surface data are shown in Table 16 below.

TABLE 15

8th Embodiment
f = 2.98 mm, Fno = 2.50, HFOV = 39.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.069 | | | | |
| 2 | Lens 1 | 1.995 (ASP) | 0.314 | Plastic | 1.535 | 56.3 | 34.97 |
| 3 | | 2.111 (ASP) | 0.086 | | | | |
| 4 | Lens 2 | 1.545 (ASP) | 0.291 | Plastic | 1.535 | 56.3 | 7.41 |
| 5 | | 2.367 (ASP) | 0.187 | | | | |
| 6 | Lens 3 | 4.412 (ASP) | 0.530 | Plastic | 1.535 | 56.3 | 3.78 |
| 7 | | −3.565 (ASP) | 0.254 | | | | |
| 8 | Lens 4 | −0.749 (ASP) | 0.339 | Plastic | 1.650 | 21.4 | −2.98 |
| 9 | | −1.440 (ASP) | 0.035 | | | | |
| 10 | Lens 5 | 2.419 (ASP) | 0.944 | Plastic | 1.535 | 56.3 | 1.31 |
| 11 | | −0.851 (ASP) | 0.117 | | | | |

TABLE 15-continued

8th Embodiment
f = 2.98 mm, Fno = 2.50, HFOV = 39.6 deg.

| Surface # | | Curvature Radius | | Thickness | Material | Index | Abbe # | Focal length |
|---|---|---|---|---|---|---|---|---|
| 12 | Lens 6 | ∞ | (ASP) | 0.288 | Plastic | 1.535 | 56.3 | −1.29 |
| 13 | | 0.692 | (ASP) | 0.600 | | | | |
| 14 | IR-cut filter | Plano | | 0.200 | Glass | 1.517 | 64.2 | — |
| 15 | | Plano | | 0.317 | | | | |
| 16 | Image | Plano | | — | | | | |

Note:
Reference wavelength (d-line) is 587.6 nm.

TABLE 16

Aspheric Coefficients

| Surface # | 2 | 3 | 4 | 5 | 6 | 7 |
|---|---|---|---|---|---|---|
| k = | −3.3872E+00 | −2.0000E+01 | −7.0403E+00 | −2.8509E+00 | −2.0000E+01 | 5.4921E+00 |
| A4 = | −1.9080E−02 | −1.4020E−01 | −2.7603E−01 | −2.8510E−01 | −1.7987E−01 | −5.6842E−02 |
| A6 = | 2.8040E−01 | 1.2134E−01 | 4.7847E−01 | 1.9989E−01 | −8.8145E−02 | −1.8252E−01 |
| A8 = | −9.4735E−01 | −7.1546E−02 | −1.2150E+00 | −2.4674E−01 | 1.0272E−01 | 5.3588E−02 |
| A10 = | 6.6878E−01 | −1.3245E+00 | 8.9715E−01 | 1.4256E−01 | −1.6705E−01 | 1.2928E−02 |
| A12 = | 2.0138E+00 | 9.3684E−01 | −1.1319E−01 | −2.6736E−01 | −9.8516E−02 | 3.9173E−03 |
| A14 = | −3.6224E+00 | −3.4626E−01 | −1.9154E+00 | 1.5059E−01 | 1.5870E−01 | 2.2232E−03 |

| Surface # | 8 | 9 | 10 | 11 | 12 | 13 |
|---|---|---|---|---|---|---|
| k = | −1.8084E+00 | −2.4885E+00 | −5.0536E+00 | −6.2338E+00 | −1.0000E+00 | −5.6909E+00 |
| A4 = | 3.5026E−01 | 1.4882E−01 | −1.6930E−01 | −2.2263E−02 | −1.3658E−01 | −7.3282E−02 |
| A6 = | −8.8762E−01 | −2.7313E−01 | 1.6262E−01 | −2.9637E−02 | 3.7702E−02 | 2.1195E−02 |
| A8 = | 1.1341E+00 | 3.2233E−01 | −9.3225E−02 | 1.0177E−01 | −6.7813E−03 | −5.9747E−03 |
| A10 = | −9.2008E−01 | −2.4940E−01 | 1.4915E−02 | −8.4146E−02 | −1.1484E−03 | 1.0568E−03 |
| A12 = | 5.8851E−01 | 1.2865E−01 | 9.5168E−04 | 2.6664E−02 | 6.1364E−04 | −9.2687E−05 |
| A14 = | −1.9669E−01 | −2.9165E−02 | 2.0140E−04 | −2.7546E−03 | 8.7446E−06 | 1.9503E−06 |

In the optical image system according to the 8th embodiment, the definitions of f, Fno, HFOV, V1, V2, V4, V5, R7, R8, CT2, CT3, f1, f2, f3 and f4 are the same as those stated in the 1st embodiment with corresponding values for the 8th embodiment. Moreover, these parameters can be calculated from Table 15 and Table 16 as the following values and satisfy the following relationships:

| f (mm) | 2.98 | (R7 − R8)/(R7 + R8) | −0.32 |
|---|---|---|---|
| Fno | 2.50 | f/f2 | 0.40 |
| HFOV (deg.) | 39.6 | f/f3 + |f/f4| | 1.79 |
| V1/V2 | 1.00 | (f1 − f3)/(f1 + f3) | 0.80 |
| V5/V4 | 2.63 | (f2 − f3)/(f2 + f3) | 0.32 |
| CT2/CT3 | 0.55 | | |

9th Embodiment

Figure 17:
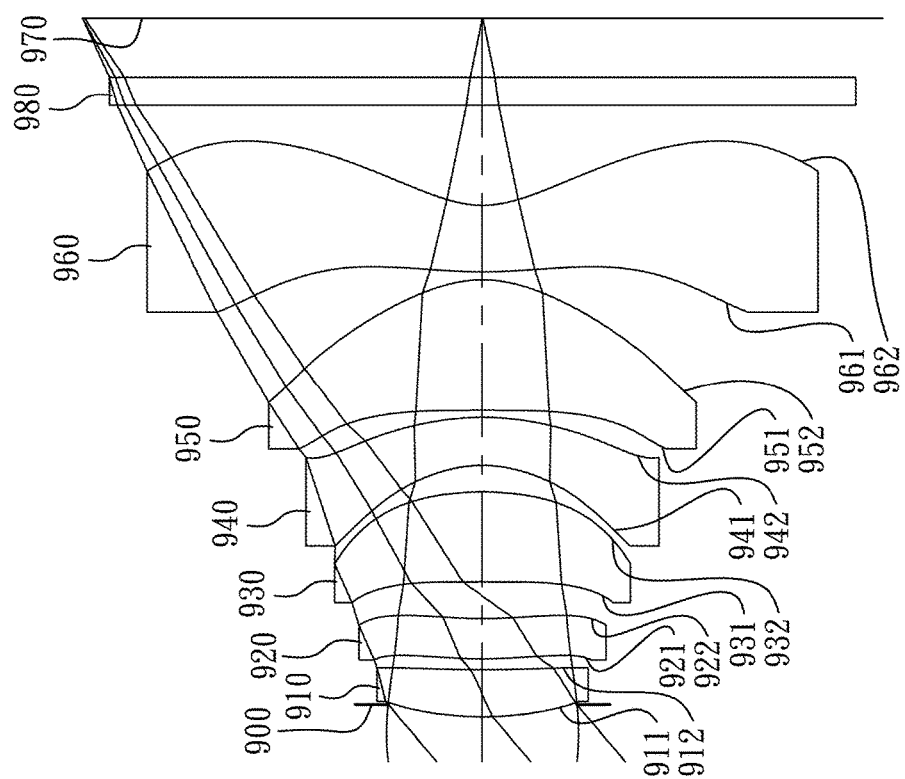
FIG. 17 is a schematic view of an optical image lens system according to the 9th embodiment of the present disclosure.
Figure 18:
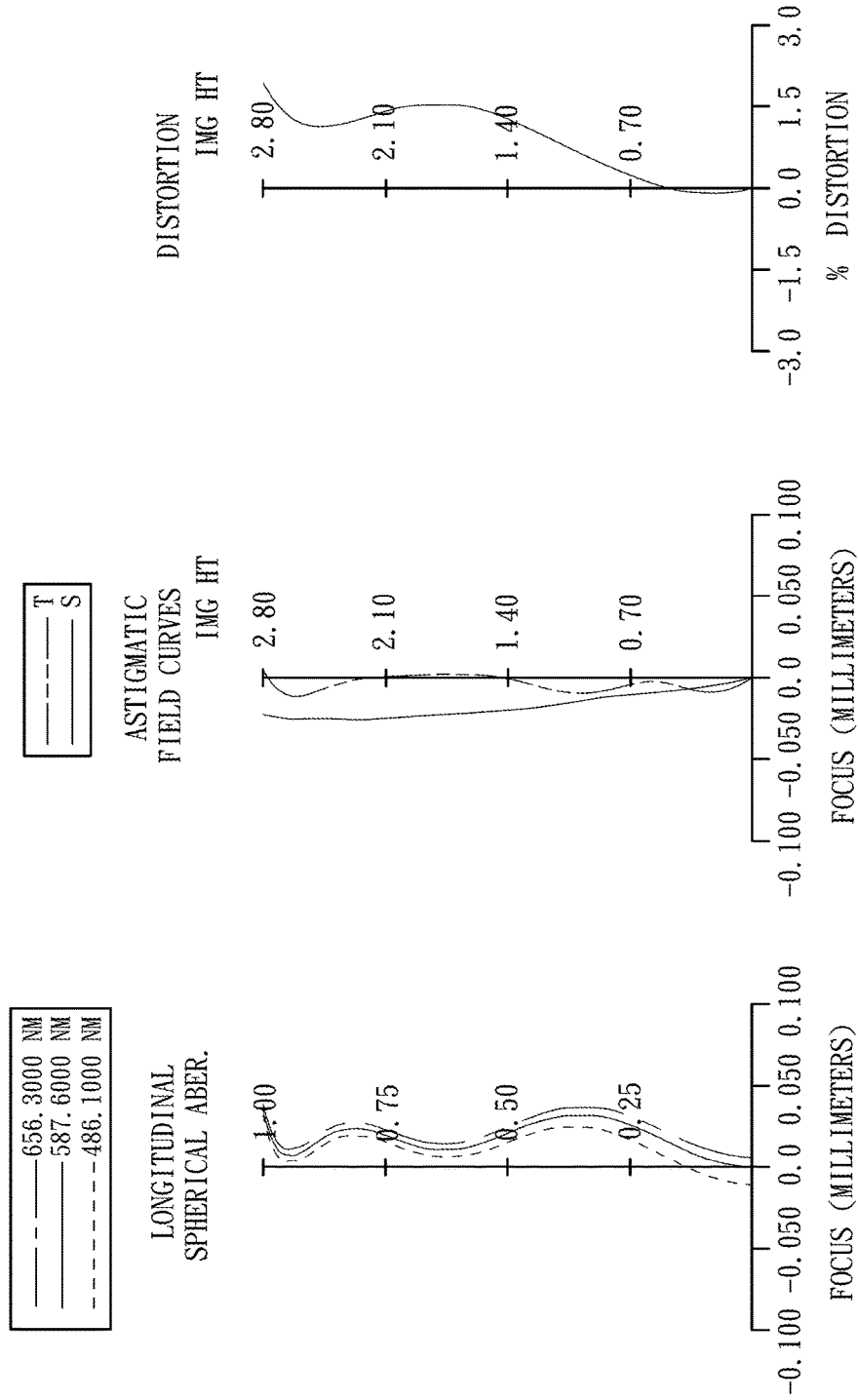
FIG. 18 shows spherical aberration curves, astigmatic field curves and a distortion curve of the optical image lens system according to the 9th embodiment.

FIG. 17 is a schematic view of an optical image lens system according to the 9th embodiment of the present disclosure. FIG. 18 shows spherical aberration curves, astigmatic field curves and a distortion curve of the optical image lens system according to the 9th embodiment. In FIG. 17, the optical image lens system includes, in order from an object side to an image side, an aperture stop 900, a first lens element 910, a second lens element 920, a third lens element 930, a fourth lens element 940, a fifth lens element 950, a sixth lens element 960, an IR-cut filter 980 and an image plane 970.

The first lens element 910 with positive refractive power has a convex object-side surface 911 and a concave image-side surface 912. The first lens element 910 is made of glass material and has the object-side surface 911 and the image-side surface 912 being aspheric.

The second lens element 920 with positive refractive power has a convex object-side surface 921 and a concave image-side surface 922. The second lens element 920 is made of plastic material and has the object-side surface 921 and the image-side surface 922 being aspheric.

The third lens element 930 with positive refractive power has a concave object-side surface 931 and a convex image-side surface 932. The third lens element 930 is made of plastic material and has the object-side surface 931 and the image-side surface 932 being aspheric.

The fourth lens element 940 with negative refractive power has a concave object-side surface 941 and a convex image-side surface 942. The fourth lens element 940 is made of plastic material and has the object-side surface 941 and the image-side surface 942 being aspheric.

The fifth lens element 950 with positive refractive power has a concave object-side surface 951 and a convex image-side surface 952. The fifth lens element 950 is made of plastic material and has the object-side surface 951 and the image-side surface 952 being aspheric.

The sixth lens element 960 with negative refractive power has a convex object-side surface 961 and a concave image-side surface 962. The sixth lens element 960 is made of plastic material and has the object-side surface 961 and the image-side surface 962 being aspheric. Furthermore, the sixth lens element 960 has inflection points on the image-side surface 962 thereof.

The IR-cut filter 980 is made of glass, and located between the sixth lens element 960 and the image plane 970, and will not affect the focal length of the optical image lens system.

The detailed optical data of the 9th embodiment are shown in Table 17 and the aspheric surface data are shown in Table 18 below.

TABLE 17

9th Embodiment
f = 3.24 mm, Fno = 2.45, HFOV = 40.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.086 | | | | |
| 2 | Lens 1 | 2.330 (ASP) | 0.334 | Glass | 1.566 | 61.1 | 5.73 |
| 3 | | 7.850 (ASP) | 0.076 | | | | |
| 4 | Lens 2 | 3.044 (ASP) | 0.282 | Plastic | 1.633 | 23.4 | 41.93 |
| 5 | | 3.315 (ASP) | 0.257 | | | | |
| 6 | Lens 3 | −28.541 (ASP) | 0.629 | Plastic | 1.535 | 56.3 | 3.83 |
| 7 | | −1.927 (ASP) | 0.185 | | | | |
| 8 | Lens 4 | −0.900 (ASP) | 0.336 | Plastic | 1.633 | 23.4 | −3.20 |
| 9 | | −1.853 (ASP) | 0.050 | | | | |
| 10 | Lens 5 | −59.373 (ASP) | 0.916 | Plastic | 1.535 | 56.3 | 1.61 |
| 11 | | −0.851 (ASP) | 0.056 | | | | |
| 12 | Lens 6 | 3.813 (ASP) | 0.464 | Plastic | 1.535 | 56.3 | −1.69 |
| 13 | | 0.699 (ASP) | 0.700 | | | | |
| 14 | IR-cut filter | Plano | 0.200 | Glass | 1.517 | 64.2 | — |
| 15 | | Plano | 0.411 | | | | |
| 16 | Image | Plano | — | | | | |

Note:
Reference wavelength (d-line) is 587.6 nm.

TABLE 18

Aspheric Coefficients

| Surface # | 2 | 3 | 4 | 5 | 6 | 7 |
|---|---|---|---|---|---|---|
| k = | −2.6579E+00 | 2.3322E−01 | −1.9999E+01 | −3.1164E+00 | −1.0000E+00 | 2.8014E−01 |
| A4 = | 3.7611E−04 | −1.8425E−01 | −3.1653E−01 | −2.8028E−01 | −1.1874E−01 | −2.5061E−02 |
| A6 = | 3.5085E−01 | 3.0351E−01 | 5.7514E−01 | 1.4049E−01 | −8.7300E−02 | −1.9139E−01 |
| A8 = | −1.1174E+00 | 2.8999E−01 | −1.0964E+00 | −1.6707E−01 | 1.2137E−01 | 4.9338E−02 |
| A10 = | 1.1395E+00 | −1.1537E+00 | 1.1250E+00 | 1.1201E−01 | −1.3086E−01 | 1.2014E−02 |
| A12 = | 2.0282E+00 | 6.6955E−01 | 1.4439E−02 | −2.7001E−01 | −1.1287E−01 | −8.9646E−03 |
| A14 = | −3.6199E+00 | −3.4243E−01 | −1.9141E+00 | 1.1110E−01 | 1.2615E−01 | 3.4752E−04 |

| Surface # | 8 | 9 | 10 | 11 | 12 | 13 |
|---|---|---|---|---|---|---|
| k = | −1.1162E+00 | −1.1870E+00 | −1.7665E+01 | −4.0404E+00 | −1.0000E+00 | −4.2474E+00 |
| A4 = | 2.9924E−01 | 1.2198E−01 | −1.7204E−01 | −7.3104E−02 | −1.4166E−01 | −6.9781E−02 |
| A6 = | −9.0597E−01 | −2.7603E−01 | 1.4571E−01 | −3.6228E−02 | 3.9430E−02 | 2.2733E−02 |
| A8 = | 1.1222E+00 | 3.2651E−01 | −1.0227E−01 | 1.0548E−01 | −7.6939E−03 | −6.0519E−03 |
| A10 = | −9.2228E−01 | −2.4657E−01 | 1.4052E−02 | −8.2912E−02 | 5.9497E−04 | 1.0304E−03 |
| A12 = | 6.0070E−01 | 1.2932E−01 | 3.7322E−03 | 2.6541E−02 | 1.7207E−04 | −1.0923E−04 |
| A14 = | −1.8996E−01 | −2.8230E−02 | 2.0052E−03 | −2.8219E−03 | −2.7531E−05 | 5.5361E−06 |

In the optical image system according to the 9th embodiment, the definitions of f, Fno, HFOV, V1, V2, V4, V5, R7, R8, CT2, CT3, f1, f2, f3 and f4 are the same as those stated in the 1st embodiment with corresponding values for the 9th embodiment. Moreover, these parameters can be calculated from Table 17 and Table 18 as the following values and satisfy the following relationships:

| f (mm) | 3.24 | (R7 − R8)/(R7 + R8) | −0.35 |
|---|---|---|---|
| Fno | 2.45 | f/f2 | 0.08 |
| HFOV (deg.) | 40.2 | f/f3 + |f/f4| | 1.86 |
| V1/V2 | 2.61 | (f1 − f3)/(f1 + f3) | 0.20 |
| V5/V4 | 2.41 | (f2 − f3)/(f2 + f3) | 0.83 |
| CT2/CT3 | 0.45 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image lens system comprising six lens elements, the six lens elements being, in order from an object side to an image side:
   a first lens element;
   a second lens element having positive refractive power;
   a third lens element;
   a fourth lens element;
   a fifth lens element having a convex object-side surface, wherein the object-side surface of the fifth lens element is aspheric and comprises at least one inflection point thereon; and
   a sixth lens element with negative refractive power having a concave image-side surface, wherein the image-side surface of the sixth lens element is aspheric and comprises at least one inflection point thereon;
   wherein the optical image lens system has a total of six lens elements and excludes any lens elements other than the first lens element, the second lens element, the third lens element, the fourth lens element, the fifth lens element and the sixth lens element, there is an air gap in a paraxial region between every adjacent lens elements of the optical image lens system.

2. The optical image lens system of claim 1, wherein the fifth lens element with positive refractive power has a convex image-side surface.

3. The optical image lens system of claim 1, wherein the first lens element has a concave image-side surface.

4. The optical image lens system of claim 1, wherein the third lens element has a convex object-side surface.

5. The optical image lens system of claim 1, wherein the fourth lens element has negative refractive power.

6. The optical image lens system of claim 1, wherein the sixth lens element has a convex object-side surface.

7. The optical image lens system of claim 1, wherein an object-side surface of the sixth lens element comprises at least one inflection point thereon.

8. The optical image lens system of claim 1, further comprising:

an aperture stop located between the first lens element and the second lens element.

9. The optical image lens system of claim 1, wherein a focal length of the optical image lens system is f, a focal length of the second lens element is f2, and the following relationship is satisfied:

$$0<f/f2<0.80.$$

10. The optical image lens system of claim 1, wherein an Abbe number of the first lens element is V1, an Abbe number of the second lens element is V2, and the following relationship is satisfied:

$$0.7<V1/V2<1.3.$$

11. The optical image lens system of claim 1, wherein a focal length of the first lens element is f1, a focal length of the third lens element is f3, and the following relationship is satisfied:

$$0<(f1-f3)/(f1+f3)<1.0.$$

12. An optical image lens system comprising six lens elements, the six lens elements being, in order from an object side to an image side:
   a first lens element;
   a second lens element having positive refractive power;
   a third lens element;
   a fourth lens element;
   a fifth lens element having a convex object-side surface; and
   a sixth lens element with negative refractive power having a concave image-side surface, wherein the image-side surface of the sixth lens element is aspheric and comprises at least one inflection point thereon;
   wherein the optical image lens system has a total of six lens elements and excludes any lens elements other than the first lens element, the second lens element, the third lens element, the fourth lens element, the fifth lens element and the sixth lens element, there is an air gap in a paraxial region between every adjacent lens elements of the optical image lens system;
   wherein an absolute value of a focal length of the third lens element is greater than an absolute value of a focal length of the fifth lens element, and an absolute value of a focal length of the fourth lens element is greater than an absolute value of a focal length of the sixth lens element.

13. The optical image lens system of claim 12, wherein the fifth lens element with positive refractive power has a convex image-side surface.

14. The optical image lens system of claim 12, wherein an object-side surface of the sixth lens element comprises at least one inflection point thereon.

15. The optical image lens system of claim 12, further comprising:
   an aperture stop located between the first lens element and the second lens element.

16. The optical image lens system of claim 12, wherein the third lens element has a convex object-side surface.

17. The optical image lens system of claim 12, wherein the first lens element has a concave image-side surface.

18. The optical image lens system of claim 12, wherein the fourth lens element has negative refractive power.

19. The optical image lens system of claim 12, wherein each of the first lens element, the second lens element, the third lens element, the fourth lens element, the fifth lens element and the sixth lens element has an object-side surface and an image-side surface being both aspheric, and is made of a plastic material.

20. The optical image lens system of claim 12, wherein the sixth lens element has a convex object-side surface.

21. The optical image lens system of claim 12, wherein an Abbe number of the first lens element is V1, an Abbe number of the second lens element is V2, and the following relationship is satisfied:

$$0.7<V1/V2<1.3.$$

22. The optical image lens system of claim 12, wherein an Abbe number of the fourth lens element is V4, an Abbe number of the fifth lens element is V5, and the following relationship is satisfied:

$$1.5<V5/V4<3.5.$$

* * * * *